(12) United States Patent
Kadiri et al.

(10) Patent No.: US 11,876,635 B2
(45) Date of Patent: Jan. 16, 2024

(54) SELECTIVE PROCESSING OF MULTICAST AND BROADCAST RETRANSMISSIONS

(71) Applicant: QUALCOMM Incorporated, San Diego, CA (US)

(72) Inventors: Prasad Reddy Kadiri, San Diego, CA (US); Sitaramanjaneyulu Kanamarlapudi, San Diego, CA (US); Le Liu, Fremont, CA (US); Kazuki Takeda, Tokyo (JP); Gavin Bernard Horn, La Jolla, CA (US); Xipeng Zhu, San Diego, CA (US); Umesh Phuyal, San Diego, CA (US); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/117,843

(22) Filed: Dec. 10, 2020

(65) Prior Publication Data

US 2021/0194714 A1    Jun. 24, 2021

Related U.S. Application Data

(60) Provisional application No. 62/951,851, filed on Dec. 20, 2019.

(51) Int. Cl.
| | |
|---|---|
| *H04L 12/18* | (2006.01) |
| *H04W 72/30* | (2023.01) |
| *H04W 4/08* | (2009.01) |

(52) U.S. Cl.
CPC ........... *H04L 12/1868* (2013.01); *H04W 4/08* (2013.01); *H04W 72/30* (2023.01)

(58) Field of Classification Search
None
See application file for complete search history.

(56) References Cited

U.S. PATENT DOCUMENTS

| | | |
|---|---|---|
| 2013/0301515 A1 | 11/2013 | Kim et al. |
| 2014/0173372 A1 | 6/2014 | Maaref et al. |

(Continued)

FOREIGN PATENT DOCUMENTS

| | | |
|---|---|---|
| CN | 102047699 A | 5/2011 |
| WO | WO-2017119771 A1 | 7/2017 |

OTHER PUBLICATIONS

International Search Report and Written Opinion—PCT/US2020/064480—ISA/EPO—dated Mar. 18, 2021.

(Continued)

*Primary Examiner* — Yemane Mesfin
*Assistant Examiner* — Jeff Banthrongsack
(74) *Attorney, Agent, or Firm* — Holland & Hart LLP

(57) ABSTRACT

Methods, systems, and devices for wireless communications are described. A user equipment (UE) may selectively determine to decode a downlink shared channel multicast transmission based on whether the downlink shared channel includes a retransmission of an initial multicast transmission. A base station may transmit a message in a downlink control channel to indicate if the downlink shared channel is carrying the retransmission of the initial multicast transmission. For example, the base station may transmit a group random network temporary identifier, downlink control information with a retransmission indicator bit, or both to indicate if the downlink shared channel is carrying the retransmission. In some cases, the message in the downlink control channel may be received at a layer one (L1) of the UE, and the downlink shared channel transmission may be decoded at L1 of the UE and sent to a layer two (L2) of the UE for processing.

27 Claims, 19 Drawing Sheets

(56) References Cited

U.S. PATENT DOCUMENTS

| | | | | |
|---|---|---|---|---|
| 2015/0124681 A1* | 5/2015 | Zhou | .................... | H04L 12/189 370/312 |
| 2016/0119762 A1* | 4/2016 | Zhu | .................... | H04B 7/0456 370/312 |
| 2017/0201964 A1* | 7/2017 | Gupta | .................. | H04W 48/20 |
| 2018/0098358 A1* | 4/2018 | Rico Alvarino | ...... | H04W 52/34 |
| 2019/0036652 A1 | 1/2019 | Baghel et al. | | |

OTHER PUBLICATIONS

Qualcomm Incorporated: "Solution: Integrated MBS and Unicast Transport with Full Separation of MBS Service", 3GPP Draft, S2-1911371, SA WG2 Meeting #136, 3rd Generation Partnership Project (3GPP), Mobile Competence Centre, 650, Route Des Lucioles, F-06921, Sophia-Antipolis Cedex, France, vol. SA WG2, no. Reno, Nevada, USA, Nov. 18, 2019-Nov. 22, 2019, Nov. 8, 2019 (Nov. 8, 2019), XP051821463, pp. 1-6, Retrieved from the Internet: URL:https://ftp.3gpp.org/tsg_sa/WG2_Arch/SGS2_136_Reno/Docs/S2-1911371.zip, S2-1911371-PCR-23757_Solution_Separation_transport_service_v2.doc, [retrieved on Nov. 8, 2019] p. 3.

Qualcomm Incorporated: "View on UE feedback for Multicast RRC_Connected UEs", 3GPP Draft, R1-2006831, 3GPP TSG RAN WG1 #102-e, 3rd Generation Partnership Project (3GPP), Mobile Competence Centre, 650, Route Des Lucioles, F-06921, Sophia-Antipolis Cedex, France, vol. RAN WG1, no. e-Meeting, Aug. 17, 2020-Aug. 28, 2020, Aug. 8, 2020 (Aug. 8, 2020), XP051918281, 4 Pages, Retrieved from the Internet: URL:https://ftp.3gpp.org/tsg_ran/WG1_RL1/TSGR1_102-e/Docs/R1-2006831.zip, R1-2006831_NR Multicast UE feedback for CONN_v2.doc [retrieved on Aug. 8, 2020] the Whole Document.

XINWEI: "Discussion on SC-MTCH in NB-Iot", 3GPP Draft, R1-1612254, 3GPP TSG RAN WG1 Meeting #87, Discussion on SC-MTCH in NB-Iot, 3rd Generation Partnership Project (3GPP), Mobile Competence Centre, 650, Route Des Lucioles, F-06921, Sophia-Antipolis Cedex, France, vol. RAN WG1, no. Reno, USA, Nov. 14, 2016-Nov. 18, 2016, Nov. 13, 2016 (Nov. 13, 2016), XP051176203, 4 Pages, Retrieved from the Internet: URL:http://www.3gpp.org/ftp/Meetings_3GPP_SYNC/RAN1/Docs/, [retrieved on Nov. 13, 2016] p. 3, Paragraph 1.

\* cited by examiner

SELECTIVE PROCESSING OF MULTICAST AND BROADCAST RETRANSMISSIONS

CROSS REFERENCE

The present Application for Patent claims the benefit of U.S. Provisional Patent Application No. 62/951,851 by KADIRI et al., entitled "SELECTIVE PROCESSING OF MULTICAST AND BROADCAST RETRANSMISSIONS," filed Dec. 20, 2019, assigned to the assignee hereof, and expressly incorporated by reference herein.

FIELD OF TECHNOLOGY

The following relates generally to wireless communications and more specifically to selective processing of multicast and broadcast retransmissions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). In some cases, a base station may perform a transmission that carries one or more sets of data that are each intended for a respective UE. Such a transmission may be referred to as a unicast transmission. Additionally, or alternatively, a base station may perform a transmission that carries a set of data that is intended for multiple UEs. Such a transmission may be referred to as a multicast transmission.

SUMMARY

The described techniques relate to improved methods, systems, devices, and apparatuses that support selective processing of multicast and broadcast retransmissions. Generally, the described techniques provide for a user equipment (UE) to selectively determine to decode a downlink shared channel multicast transmission (e.g., a physical downlink shared channel (PDSCH) transmission) based on whether a corresponding downlink shared channel includes a retransmission of an initial multicast transmission. In some cases, a base station may transmit a message in a downlink control channel (e.g., a physical downlink control channel (PDCCH)) to indicate if the downlink shared channel is carrying the retransmission of the initial multicast transmission or is carrying a new multicast transmission. For example, the base station may transmit a group radio network temporary identifier (G-RNTI), downlink control information (DCI) with a retransmission indicator bit, or both to indicate if the downlink shared channel is carrying the retransmission. In some cases, the message in the downlink control channel may be received at a layer one (L1) of the UE, and the downlink shared channel transmission may be decoded at L1 of the UE and sent to a layer two (L2) of the UE for processing.

Accordingly, if the initial multicast transmission is successfully decoded, the UE may refrain from decoding the downlink shared channel if the message indicates the downlink shared channel is carrying the retransmission of the initial multicast transmission. Alternatively, if the initial multicast transmission is not successfully decoded, the UE may decode the downlink shared channel if the message indicates the downlink shared channel is carrying the retransmission of the initial multicast transmission. In some cases, the UE may transmit a negative acknowledgment (NACK) feedback message based on not successfully decoding the initial multicast transmission (e.g., when in a connected state) and may decode the downlink shared channel when the message indicates the downlink shared channel is carrying the retransmission of the initial multicast transmission based on transmitting the NACK feedback message. Additionally or alternatively, the UE may determine that at least a portion of the initial multicast transmission is unsuccessfully decoded (e.g., when in an idle or inactive state) and may decode the downlink shared channel when the message indicates the downlink shared channel is carrying the retransmission of the initial multicast transmission based on the determination that the at least portion of the initial multicast transmission is unsuccessfully decoded.

In some cases, the base station may group a set of UEs receiving multicast transmissions from the base station into subgroups of UEs. For example, the subgroups of UEs may include multiple UEs of the set of UEs with similar coverage, channel state information (CSI), downlink control channel repetitions, a signal-to-noise ratio (SNR), a channel quality indicator (CQI), a beam direction, a transmit beam identifier, or a combination thereof. Subsequently, if retransmitting a multicast transmission, the base station may transmit the message in the downlink control channel indicating the downlink shared channel is carrying the retransmission and the downlink shared transmission carrying the retransmission to one or more subgroups of UEs rather than to all of the set of UEs.

A method of wireless communications at a UE is described. The method may include receiving, from a base station, a multicast transmission, where the multicast transmission is transmitted to a set of UEs that includes the UE; attempting to decode the multicast transmission; receiving, from the base station, a message in a downlink control channel, the message indicating that a downlink shared channel transmission is a retransmission of the multicast transmission; and determining whether to decode the downlink shared channel transmission based on the message.

An apparatus for wireless communications at a UE is described. The apparatus may include a processor, memory coupled with the processor, and instructions stored in the memory. The instructions may be executable by the processor to cause the apparatus to receive, from a base station, a multicast transmission, where the multicast transmission is transmitted to a set of UEs that includes the UE; to attempt to decode the multicast transmission; to receive, from the base station, a message in a downlink control channel, the message indicating that a downlink shared channel transmission is a retransmission of the multicast transmission;

and to determine whether to decode the downlink shared channel transmission based on the message.

Another apparatus for wireless communications at a UE is described. The apparatus may include means for receiving, from a base station, a multicast transmission, where the multicast transmission is transmitted to a set of UEs that includes the UE; means for attempting to decode the multicast transmission; means for receiving, from the base station, a message in a downlink control channel, the message indicating that a downlink shared channel transmission is a retransmission of the multicast transmission; and means for determining whether to decode the downlink shared channel transmission based on the message.

A non-transitory computer-readable medium storing code for wireless communications at a UE is described. The code may include instructions executable by a processor to receive, from a base station, a multicast transmission, where the multicast transmission is transmitted to a set of UEs that includes the UE; to attempt to decode the multicast transmission; to receive, from the base station, a message in a downlink control channel, the message indicating that a downlink shared channel transmission is a retransmission of the multicast transmission; and to determine whether to decode the downlink shared channel transmission based on the message.

In some examples of the method, apparatuses, and non-transitory computer-readable medium described herein, determining whether to decode the downlink shared channel transmission further may include operations, features, means, or instructions for determining to decode or to refrain from decoding the downlink shared channel transmission based on the message including a first G-RNTI indicating the retransmission of the multicast transmission or a retransmission indicator bit in DCI.

Some examples of the method, apparatuses, and non-transitory computer-readable medium described herein may further include operations, features, means, or instructions for refraining from decoding the downlink shared channel transmission based on the message indicating the downlink shared channel transmission is the retransmission of the multicast transmission, where the multicast transmission is successfully decoded.

Some examples of the method, apparatuses, and non-transitory computer-readable medium described herein may further include operations, features, means, or instructions for decoding the downlink shared channel transmission based on the message indicating the downlink shared channel transmission is the retransmission of the multicast transmission, where the multicast transmission is unsuccessfully decoded.

Some examples of the method, apparatuses, and non-transitory computer-readable medium described herein may further include operations, features, means, or instructions for transmitting, to the base station, an acknowledgment feedback message based on decoding the multicast transmission.

Some examples of the method, apparatuses, and non-transitory computer-readable medium described herein may further include operations, features, means, or instructions for refraining from decoding the downlink shared channel transmission based on the acknowledgment feedback message indicating the multicast transmission is successfully decoded by the UE and the message indicating the downlink shared channel transmission is the retransmission of the multicast transmission.

Some examples of the method, apparatuses, and non-transitory computer-readable medium described herein may further include operations, features, means, or instructions for decoding the downlink shared channel transmission based on the acknowledgment feedback message indicating the multicast transmission is unsuccessfully decoded by the UE and the message indicating the downlink shared channel transmission is the retransmission of the multicast transmission.

In some examples of the method, apparatuses, and non-transitory computer-readable medium described herein, the acknowledgment feedback may be transmitted based on being in a connected state.

Some examples of the method, apparatuses, and non-transitory computer-readable medium described herein may further include operations, features, means, or instructions for determining that at least a portion of the multicast transmission is unsuccessfully decoded, and decoding the downlink shared channel transmission based on the determination and the message indicating the downlink shared channel transmission is the retransmission of the multicast transmission.

In some examples of the method, apparatuses, and non-transitory computer-readable medium described herein, the determination that at least the portion of the multicast transmission is unsuccessfully decoded may be made at a radio link control (RLC) layer of the UE (e.g., or a different layer of the UE) and may be based on the being in an idle or inactive state.

Some examples of the method, apparatuses, and non-transitory computer-readable medium described herein may further include operations, features, means, or instructions for decoding first DCI using a first G-RNTI indicating the retransmission of the multicast transmission, and decoding second DCI using a second G-RNTI indicating an additional multicast transmission, where the determination on whether to decode the downlink shared channel transmission may be based on the first DCI, the second DCI, or a combination thereof.

In some examples of the method, apparatuses, and non-transitory computer-readable medium described herein, the first DCI and the second DCI may be decoded based on a processing parameter of the UE.

Some examples of the method, apparatuses, and non-transitory computer-readable medium described herein may further include operations, features, means, or instructions for transmitting, to the base station, a NACK feedback message based on unsuccessfully decoding the multicast transmission, and decoding first DCI using a first G-RNTI indicating the retransmission of the multicast transmission based on transmitting the NACK feedback message.

In some examples of the method, apparatuses, and non-transitory computer-readable medium described herein, the first DCI and the first G-RNTI may be associated with a second DCI and a cell radio network temporary identifier (C-RNTI), and the first DCI may be monitored using the first G-RNTI based on monitoring the second DCI using the C-RNTI.

Some examples of the method, apparatuses, and non-transitory computer-readable medium described herein may further include operations, features, means, or instructions for determining the message is allocated for a subgroup of UEs for the set of UEs, where the subgroup of UEs includes the UE, and decoding the downlink shared channel transmission based on the message being allocated to the subgroup of UEs and the message indicating the downlink shared transmission is the retransmission of the multicast transmission.

In some examples of the method, apparatuses, and non-transitory computer-readable medium described herein, the subgroup of UEs may be determined based on CSI reports from the set of UEs.

In some examples of the method, apparatuses, and non-transitory computer-readable medium described herein, the subgroup of UEs may be one subgroup of a set of subgroups of UEs, each subgroup of the set of subgroups of UEs being based on coverage, CSI, downlink control channel repetitions, an SNR, a CQI, a beam direction, a transmit beam identifier, or a combination thereof for UEs in each subgroup.

In some examples of the method, apparatuses, and non-transitory computer-readable medium described herein, the message in the downlink control channel may be received at an L1 of the UE, and the downlink shared channel transmission may be decoded at the L1 of the UE and sent to an L2 of the UE for processing.

A method of wireless communications at a base station is described. The method may include transmitting, to a set of UEs, a multicast transmission; determining to transmit a retransmission of the multicast transmission; and transmitting a message in a downlink control channel, the message indicating that a downlink shared channel transmission is the retransmission of the multicast transmission.

An apparatus for wireless communications at a base station is described. The apparatus may include a processor, memory coupled with the processor, and instructions stored in the memory. The instructions may be executable by the processor to cause the apparatus to transmit, to a set of UEs, a multicast transmission; to determine to transmit a retransmission of the multicast transmission; and to transmit a message in a downlink control channel, the message indicating that a downlink shared channel transmission is the retransmission of the multicast transmission.

Another apparatus for wireless communications at a base station is described. The apparatus may include means for transmitting, to a set of UEs, a multicast transmission; means for determining to transmit a retransmission of the multicast transmission; and means for transmitting a message in a downlink control channel, the message indicating that a downlink shared channel transmission is the retransmission of the multicast transmission.

A non-transitory computer-readable medium storing code for wireless communications at a base station is described. The code may include instructions executable by a processor to transmit, to a set of UEs, a multicast transmission; to determine to transmit a retransmission of the multicast transmission; and to transmit a message in a downlink control channel, the message indicating that a downlink shared channel transmission is the retransmission of the multicast transmission.

In some examples of the method, apparatuses, and non-transitory computer-readable medium described herein, determining to transmit the retransmission of the multicast transmission further may include operations, features, means, or instructions for receiving, from at least one UE of the set of UEs, a NACK feedback message indicating that the multicast transmission is unsuccessfully decoded, and transmitting the retransmission of the multicast transmission in the downlink shared channel transmission based on the NACK feedback message.

In some examples of the method, apparatuses, and non-transitory computer-readable medium described herein, the message may include a first G-RNTI indicating the retransmission of the multicast transmission or a retransmission indicator bit in DCI.

Some examples of the method, apparatuses, and non-transitory computer-readable medium described herein may further include operations, features, means, or instructions for determining multiple subgroups of UEs for the set of UEs based on coverage, CSI, downlink control channel repetitions, an SNR, a CQI, a beam direction, a transmit beam identifier, or a combination thereof for UEs in each subgroup of the multiple subgroups of UEs, and transmitting the retransmission of the multicast transmission in the downlink shared channel transmission to at least one subgroup of UEs.

Some examples of the method, apparatuses, and non-transitory computer-readable medium described herein may further include operations, features, means, or instructions for receiving, from at least one UE in one subgroup of the multiple subgroups of UEs, a NACK feedback message indicating that the multicast transmission is unsuccessfully decoded, and transmitting, to the one subgroup, the retransmission of the multicast transmission in the downlink shared channel transmission based on the NACK feedback message.

In some examples of the method, apparatuses, and non-transitory computer-readable medium described herein, the message in the downlink control channel may be transmitted to an L1 of the set of UEs, and the downlink shared channel transmission may be transmitted over the L1 to the set of UEs containing L2 data packets.

DETAILED DESCRIPTION

Figure 1:
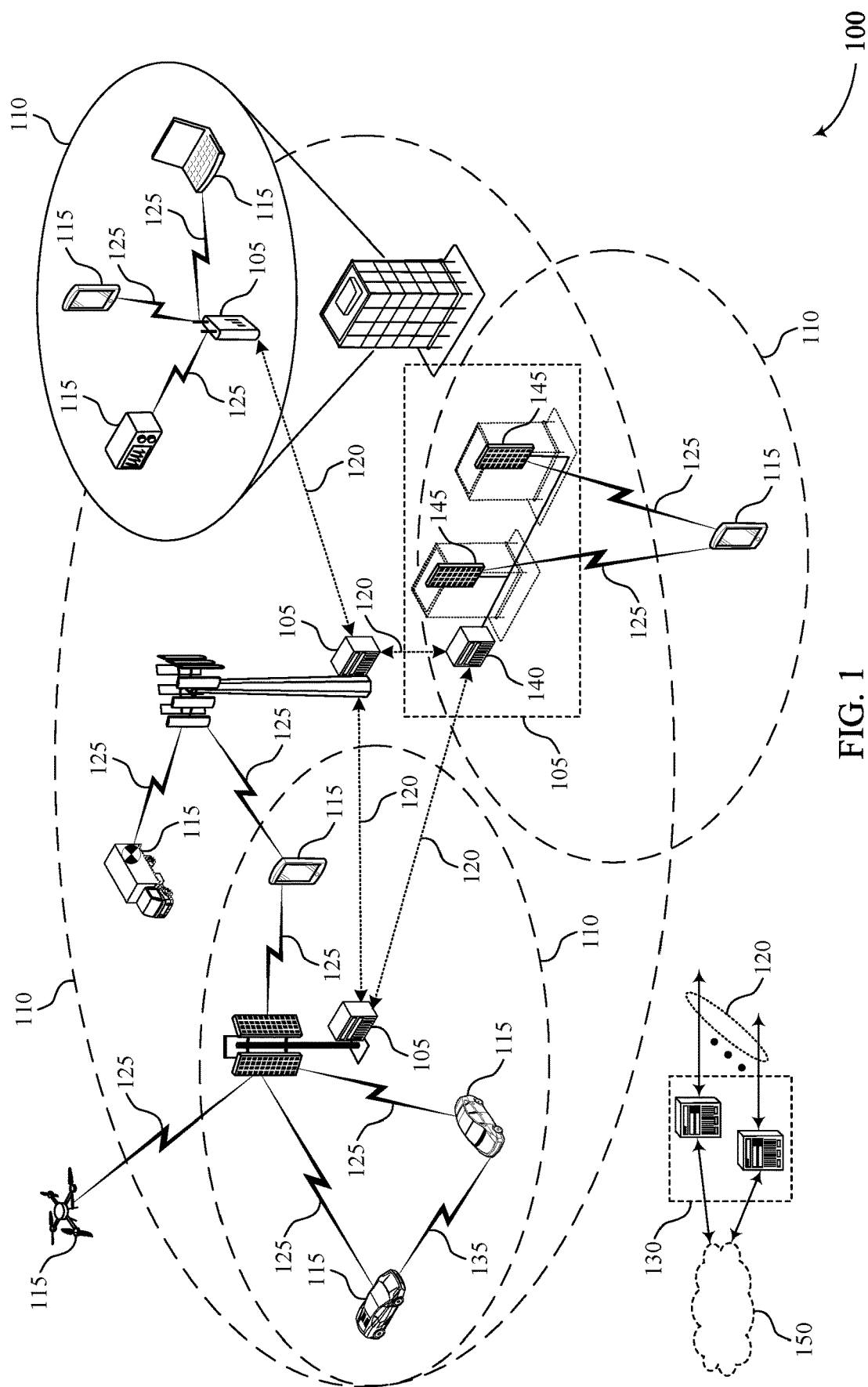
FIG. 1 illustrates an example of a system for wireless communications that supports selective processing of multicast and broadcast retransmissions in accordance with aspects of the present disclosure.

In some cases, a wireless communications system may support both unicast and multicast transmissions for communication between devices (e.g., between a base station and a user equipment (UE)). Unicast transmissions may involve transmitting sets of data that are intended for individual UEs. Multicast transmissions may involve transmitting a set of data that is intended for multiple UEs. In some cases, while performing unicast transmissions, a base station may be provided with channel information (e.g., location information, channel condition information, etc.) for each UE that receives or is scheduled to receive a unicast transmission. By contrast, a base station performing multicast transmission may not be provided with channel information for UEs that are receiving a multicast transmission—e.g., the UEs may autonomously monitor for and access multicast communication resources without coordination with the base station.

When operating in a multicast environment, a base station may receive a negative acknowledgment (NACK) feedback message after transmitting an initial multicast transmission of downlink scheduled data to a set of UEs (e.g., in a physical downlink shared channel (PDSCH)). Accordingly, the base station may then retransmit the multicast transmission and downlink scheduled data to the set of UEs (e.g., in a subsequent PDSCH). However, in some cases, a majority of the UEs may have successfully decoded the downlink scheduled data in the initial multicast transmission. In order to determine that the retransmission is a retransmission of the same downlink scheduled data included in the initial multicast transmission and thus of little interest to the UEs that successfully decoded the initial multicast transmission, the UEs may currently decode the retransmitted message and data in its entirety. As such, for the UEs that successfully decoded the initial multicast transmission and corresponding downlink scheduled data, this extra decoding is a waste of baseband processing and power performance.

As described herein, the UEs may selectively decode a multicast transmission and corresponding downlink data (e.g., transmitted in a PDSCH) based on an indication in a downlink control channel (e.g., a physical downlink control channel (PDCCH), downlink control information (DCI), etc.) indicating that the downlink data in the multicast transmission is a retransmission of data previously sent in a multicast transmission or is a new multicast transmission. For example, if a UE originally did not successfully decode downlink data sent in an initial multicast transmission and transmitted a NACK feedback message, the UE may then decode the downlink data sent in a second multicast transmission (e.g., via a downlink shared channel, such as a PDSCH) if the second multicast transmission is a retransmission of the initial multicast transmission. Additionally or alternatively, if the UE did successfully decode the downlink data in the initial multicast transmission and transmitted a positive acknowledgment feedback message (e.g., an acknowledgment (ACK) message, or conversely did not transmit a NACK feedback message), the UE may then refrain from decoding the downlink data sent in the second multicast transmission if the second multicast transmission is the retransmission of the initial multicast transmission, thereby not wasting baseband processing and power performance. While the UE may still decode the downlink control channel in order to determine the indication, decoding the downlink control channel may be more power-efficient than decoding the entire second multicast transmission.

The indication in the downlink control channel may include a group radio network temporary identifier (G-RNTI) that indicates the multicast transmission transmitted in a downlink shared channel is a retransmission of previously transmitted downlink data (e.g., a G-RNTI') or that indicates the multicast transmission transmitted in the downlink shared channel is a new transmission of downlink data (e.g., a conventional G-RNTI). Additionally or alternatively, the indication in the downlink control channel may be a layer two (L2) retransmission indicator bit that indicates if the multicast transmission is a retransmission of previously transmitted downlink data. Accordingly, the downlink control channel and indication may indicate if the multicast transmission contains a retransmission of downlink data by using the G-RNTI' and/or the L2 retransmission indicator bit and that the downlink shared channel is meant for an L2 retransmission. Subsequently, the downlink shared channel may carry the retransmission of the downlink data from the initial multicast transmission (e.g., L2 data). A layer one (L1) of the UE may perform physical (PHY) layer decoding of the downlink control channel and the downlink shared channel, and then the L1 may send the downlink shared channel to an L2 of the UE for further processing. Additionally, a radio link control (RLC) layer of the UE (e.g., or a different layer of the UE) at L2 may determine whether the downlink shared channel includes a portion of the downlink data sent in the initial multicast transmission unsuccessfully decoded (e.g., a missing RLC hole) or the entire L2 data packet transmission from the initial multicast transmission.

Additionally, the set of UEs may be split into multiple subgroups, where separate indicators (e.g., multiple G-RNTI') are configured for each subgroup. For example, separate indicators from a set of G-RNTI' (e.g., $\{G_1', G_2', \ldots, G_n'\}$) may be allocated to respective subgroups of the multiple subgroups (e.g., a first UE subgroup has a first indicator, a second UE subgroup has a second indicator, etc. up to an n-th UE subgroup with an n-th indicator) based on a same or similar coverage, channel state information (CSI) reporting, downlink control channel repetition, signal-to-noise ratio (SNR), channel quality indicator (CQI), same beam direction, reporting same transmit beam identifier (ID), etc. for UEs in each subgroup. Accordingly, the base station may send a retransmission for a subgroup using an allocated G-RNTI' if one of the UEs in the subgroup sends a NACK feedback message rather than sending the retransmission in a multicast transmission to all of the set of UEs. Additionally, only the UEs in the subgroup may then monitor for the allocated G-RNTI' for further power savings.

Aspects of the disclosure are initially described in the context of wireless communications systems. Additionally, aspects of the disclosure are illustrated through an additional wireless communications system, a grouping configuration, and a process flow. Aspects of the disclosure are further illustrated by and described with reference to apparatus diagrams, system diagrams, and flowcharts that relate to selective processing of multicast and broadcast retransmissions.

FIG. 1 illustrates an example of a wireless communications system 100 that supports selective processing of multicast and broadcast retransmissions in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a CSI reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest SNR, or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. An RLC layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the PHY layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a wireless communications system 100 may be configured to perform multiple transmissions each carrying data for a particular UE 115. Such transmissions may be referred to as unicast transmissions. For example, a base station 105 may send a first transmission that conveys a first set of data to a first UE 115 located within a coverage area 110 over a set of frequency resources and a second transmission that conveys a second set of data to a second UE 115 located within the coverage area 110 over the same frequency resources. In some cases, transmissions between a base station 105 and a UE 115 may fail—e.g., a receiving device may fail to detect and/or decode a transmission from a transmitting device. In some cases, transmission failures may occur based on characteristics of a channel between the base station 105 and the UE 115—e.g., the channel may introduce excessively delay or shift the phase of a transmission. Additionally or alternatively, transmission failures may occur based on interference on a channel between the base station 105 and the UE 115—e.g., nearby transmissions or physical objects may interfere with the channel.

To increase the reliability of wireless unicast communications, a wireless communications system 100 may use reference signals that indicate characteristics (or a state) of a channel between a transmitting and receiving device. In some examples, a receiving device may use reference signals to estimate a state of a channel between the transmitting and receiving device. After estimating a channel between itself and a transmitting device, a wireless device may update parameters for receiving signals (or "receiver parameters") to account for properties of the channel. Also, a receiving device (e.g., a UE 115) may report information about the estimated channel to a transmitting device (e.g., a base station 105), such as in a CSI report. A transmitting device that receives a CSI report may use the included channel information to modify transmission parameters to conform the transmission to the channel. Reference signals used by a wireless communications system 100 may include CSI-RSs, demodulation reference signals (DMRSs), and sounding reference signals (SRSs).

A base station 105 may transmit CSI-RSs to one or more UEs 115 within a coverage area 110 of base station 105 using scheduled downlink communication resources. In some cases, a common set of CSI-RSs is transmitted across a coverage area 110 of a base station 105. In some cases, the base station 105 may transmit multiple sets of common CSI-RSs across a coverage area 110 using multiple transmission beams. In some cases, a UE 115 may be configured to monitor a particular quantity of CSI-RSs within a time period.

A UE 115 that receives CSI-RSs may use the CSI-RSs to estimate a channel between the UE 115 and the base station 105. To estimate the channel, the UE 115 may measure aspects of the received CSI-RSs (including an SNR, a signal-to-interference-plus-noise ratio (SINR), a phase of the received CSI-RSs, etc.) and may compare the measured aspects with transmission parameters used for transmitting the CSI-RSs. In some cases, the UE 115 may be provided with the transmission parameters prior to the transmission of the CSI-RSs—e.g., in an initial setup message, such as an RRC message. In some cases, the UE 115 may determine multiple channel estimates based on received CSI-RSs— e.g., one channel estimate for each transmission beam used to transmit the CSI-RSs.

After determining the channel estimate(s), the UE 115 may determine a quality of the channel, a desired precoding matrix for the channel, and/or a desired transmission beam for receiving subsequent transmissions from a base station 105. In some cases, the UE 115 may determine the quality of the channel by mapping a measured SNR value to a channel quality index included in a list of channel quality indices—e.g., the UE 115 may map a measured SNR value of 6 decibels (dB) to a second channel quality indicator (CQI) index (or CQI_2). In some cases, the UE 115 determines the desired precoding matrix using a codebook that maps the measured channel characteristics to a precoding matrix that is adapted for the channel. In some examples, the determined precoding matrix corresponds to a precoding matrix index. Additionally, in some cases, the UE 115 determines the desired transmission beam based on determining the CSI-RSs with the highest SNR and the transmission beam that corresponds to the CSI-RS(s) with the highest SNR. In some cases, the determined transmission beam corresponds to a transmission beam index.

After determining a channel quality index, a precoding matrix index, and/or a transmission beam index, the UE 115 may report the channel quality index, the precoding matrix index, and/or the transmission beam index to the base station in a CSI report—e.g., using CQI field, PMI field, and a CSI-RS resource indicator (CRI) field. A CSI report may also be referred to as CSI feedback. In some cases, the UE 115 may send an explicit indication of the CSI report over physical uplink control channel (PUCCH) resources that are allocated to the UE 115. After receiving a CSI report, a base station 105 may adapt subsequent transmissions to a UE 115 based on the indices indicated in the CQI, PMI, and CRI fields. For example, in a subsequent transmission, the base station 105 may use a modulation and coding scheme (MCS) corresponding to the CQI index, a precoding matrix corresponding to the PMI index, a transmission beam corresponding to the CRI index, or a combination thereof.

A base station 105 may also transmit one or more DMRSs to UEs 115 (e.g., to UEs 115 within a corresponding coverage area 110 for the base station 105). In some cases, a set of DMRSs may be configured for a particular UE 115 and may be transmitted using, or alongside, PDSCH resources that are allocated to the UE 115—e.g., DMRS resources may be interleaved with PDSCH resources for a given UE 115. Additionally, in some cases, DMRSs may be transmitted over a particular transmission beam—e.g., a same transmission beam as the transmission beam used for a data transmission to a given UE 115. A UE 115 that receives DMRSs may use the DMRSs to estimate a channel between the UE 115 and the base station 105, as similarly discussed with reference to CSI-RSs. In some cases, DMRSs are used to determine an instantaneous SINR for a channel. Unlike CSI-RSs, a UE 115 may use DMRSs to decode a received downlink data transmission instead of using the DMRSs to report channel information.

In some cases, a UE 115 may transmit reference signals to a base station 105 to assist the base station 105 with channel estimation. For example, the UE 115 may send an uplink SRS over the system bandwidth so that the base station 105 can select optimal frequencies for communication with the UE 115. For instance, the base station 105 may measure the SRS to determine the received signal power across the system bandwidth and then use the information to implement frequency dependent scheduling of the UE 115. In some examples, a UE 115 may transmit SRSs in SRS resources (e.g., uplink communication resources scheduled for SRS) that occur periodically. For example, the SRS resources (which may also be referred to as SRS transmission occasions) may occur in every n-th subframe. In some examples, the SRS resources are located in the last symbol of an uplink subframe. However, other locations of SRS are possible. In some examples, multiple UEs 115 are configured to transmit SRSs over different (e.g., non-overlapping) sets of communication resources—e.g., to prevent interference between SRS transmissions.

To further increase the reliability of wireless unicast communications, a wireless communications system 100 may be configured to support the retransmission of failed transmissions (e.g., the wireless communications system 100 may support HARQ operations). In some cases, to support retransmissions, UEs 115 may report whether a received transmission (which may be an initial transmission) was successfully decoded or an expected transmission was not received (or detected). For example, a UE 115 may report to a base station 105 that a transmission was successfully received and decoded by transmitting a positive acknowledgment (ACK) message. Alternatively, the UE 115 may report to a base station 105 that a transmission was not received or was unsuccessfully decoded by transmitting a NACK message. In some cases, each UE 115 may be configured with uplink control channel resources (e.g., PUCCH resources) for transmitting acknowledgement feedback. After receiving a NACK message, a base station 105 may retransmit data included in the failed transmission to the UE 115. In some cases, the UE 115 may transmit the acknowledgment feedback over PUCCH resources that are allocated to the UE 115 for reporting acknowledgment feedback.

In some cases, the base station 105 may retransmit the data using the same transmission parameters that were used for the failed transmission. However, using the same transmission parameters may also result in a failure of the retransmission—e.g., if long-term interference caused the previous transmission to fail, the same long-term interference may also cause the retransmission to fail. In other cases, the base station 105 may perform the retransmission using different transmission parameters (e.g., a lower MCS, a higher transmit power, etc.) than the transmission parameters used for the failed transmission. Performing retransmissions using modified transmission parameters may be referred to as adaptive retransmission, adaptive HARQ operation, and the like. In some cases, the base station 105 selects the transmission parameters for the retransmission based on channel information reported by a UE 115 that also reports a failed transmission. For example, the base station 105 may perform the retransmission using an MCS that corresponds to a reported CQI index, a precoding matrix that corresponds to a reported PMI index, and a transmission beam that corresponds to a reported CRI index.

In some cases, to increase the reliability of wireless unicast communications, a wireless communications system 100 may perform data transmission over multiple precoding resource block groups (PRGs)—e.g., to mitigate the effects of interference on one of the PRGs. In some examples, a base station 105 may transmit data over a first set of PDSCH resources using a first precoding matrix and/or beamforming (a first PRG), a second set of PDSCH resources using a second precoding matrix and/or beamforming (a second PRG), and a third set of PDSCH resources using a third precoding matrix and/or beamforming (a third PRG). In some cases, a DMRS may be included in each of the sets of PDSCH resources. Additionally, in some cases, a UE 115 may receive the data transmission over one or more of the PRGs and may be configured to report HARQ feedback for the data transmission over multiple sets of PUCCH resources—e.g., the UE 115 may be configured to report feedback for the portion of the data transmission using the first PRG over a first set of PUCCH resources, the portion of the data transmission using the second PRG over a second set of PUCCH resources, and so on. In some cases, the UE 115 receives each portion of the data transmission based on the corresponding DMRSs included in the corresponding sets of PDSCH resources.

In some cases, a wireless communications system 100 may be configured to perform a single transmission carrying a set of data that is intended for multiple UEs 115. Such a transmission may be referred to as a multicast transmission. Some conventional systems may not support for broadcast and/or multicast service delivery. Wireless communications system 100 may include multi-mode UEs 115 capable of using multiple radio access technologies (e.g., both NR and LTE), where the multi-mode UEs 115 can receive different services from different networks (e.g., enhanced multimedia broadcast multicast service (eMBMS), enhanced television (enTV) services, etc. from LTE/EPC networks). Additionally, wireless communications system 100 may support a system design that allows UEs 115 (e.g., NR UEs) to receive one or more multicast and broadcast services (e.g., broadcast/multicast service for NR mixed mode, broadcast mode and broadcast television (TV) services, etc.). In some cases, an NR mixed mode service may be delivered by using multicast/broadcast radio bearers (MRBs) and/or dedicated radio bearers (DRBs) for UEs 115 in a connected state (e.g., RRC_CONNECTED mode or state). Additionally, broadcast services may also be delivered using MRBs for UEs 115 in either the connected state and/or an idle or inactive state (e.g., RRC_IDLE/INACTIVE mode or state).

For example, a base station 105 may perform a multicast transmission that reaches (or is detectable) across a coverage area 110. That is, a multicast transmission may be received by any authorized UE 115 within the coverage area 110. In some cases, a multicast transmission includes data for a live broadcast to be simultaneously received and displayed to individual users that have tuned into the multicast transmission. In some cases, the UEs 115 receiving the multicast transmission may be distributed throughout the coverage area 110 and implicitly arranged into groups—e.g., based on different regions of the coverage area 110. In some cases, one or more UEs 115 may fail to receive a multicast transmission while other UEs 115 may successfully receive the multicast transmission—e.g., due to localized interference on a channel between the base station 105 and the one or more UEs 115.

Unlike unicast operation, a base station 105 performing multicast operations may be unable to use references signals to determine a channel between the base station 105 and the UEs 115 receiving multicast transmissions. That is, during multicast operation, a base station 105 may not be provided with, or determine, information related to which UEs 115 are currently receiving a multicast transmission. Similarly, the base station 105 may not be provided with, or determine, a location, or general location, of the UEs 115 that are receiving the multicast transmission. Without such UE-specific information, the base station 105 may not support UE-specific transmission techniques during multicast operations. For example, a base station 105 performing multicast operations may not support CSI reporting or the transmission of UE-specific reference signals (e.g., DMRS or SRS).

In some cases, an inability of a base station 105 to determine a location of the UEs 115 that are receiving multicast transmissions may result in reduced reliability transmissions for a majority (or all) of the UEs 115 receiving the multicast transmissions. For example, if a majority (or all) of the UEs 115 receiving multicast transmissions are located in one region of a coverage area 110, a base station 105 performing multicast operations may transmit a multicast transmission that is spread across the entire coverage area 110 rather than a multicast transmission that is adapted for the region where the UEs 115 are located. Also, an inability of a base station 105 to determine channel information for UEs 115 that are receiving multicast transmissions may result in decreased reliability transmissions to a majority (or all) of the UEs 115 receiving the multicast transmissions.

That is, a base station 105 performing multicast transmissions may be unable to determine a state of a channel between the base station 105 and the UEs 115 that are receiving the multicast transmissions. Thus, the base station 105 may be prevented from modifying transmission parameters in subsequent transmissions to conform to the channel, and thus the base station 105 is prevented from better serving those UEs 115. Similarly, an inability of a base station 105 to determine a location and/or channel information of the UEs 115 may result in inefficient multicast transmissions. That is, in some cases, a base station 105 may perform a multicast transmission that is sufficient to reach all of the UEs 115 in a coverage area 110 when the base station 105 may perform an equally effective multicast transmission by directing a lower-power multicast transmission to the location of a majority (or all) of the UEs 115.

To increase the reliability and/or efficiency of multicast wireless communications, a base station 105 performing multicast operations may be configured to support the retransmission of failed multicast transmissions—e.g., multicast transmission that are not detected and/or decoded by at least one UE 115 that is currently monitoring a multicast channel. In some cases, to support multicast retransmissions, a base station 105 may configure a multicast uplink PUCCH resource for multicast HARQ feedback for each UE 115 that is authorized to receive a multicast transmission. However, allocating a dedicated multicast PUCCH resource to each UE 115 may increase overhead and decrease a throughput of a wireless communications system 100. As described herein, an RLC mode of operation may be enhanced for broadcast and multicast operations to improve UE power efficiency.

Considering broadcast services and operations and a large number of UEs 115 subscribed for the broadcast services and operations, a base station 105 may be expected to determine downlink scheduling decisions (e.g., MCS, transport block (TB) size, transmit beams, receive beams, etc.)

when broadcasting messages to the UEs 115 based on a higher probability of successful decoding for the UEs 115 rather than a higher spectral efficiency across the large subscribed user base (e.g., the large number of UEs 115 subscribed to the broadcast services and operations). Accordingly, most of the users are expected to be decoding protocol data units (PDUs) (e.g., downlink data transmitted in packets) transmitted in the broadcasted message successfully after a first broadcast. As an example, 80% of the UEs 115 may be successful, while 20% of the UEs 115 may experience various packet losses (e.g., different error rates for the UEs 115 may result in different packed losses). Subsequently, when in a connected state (e.g., able to transmit uplink messages on configured uplink resources), the UEs 115 that experience the various packet losses may transmit NACK feedback messages to indicate the packet losses and an unsuccessful decoding of the broadcast transmission. Alternatively, when in an idle/inactive state (e.g., no uplink available or configured), the UEs 115 that experience the various packet losses may not transmit acknowledgment feedback messages.

For UEs 115 in the connected state, due to receiving RLC acknowledged mode (AM) status reports (e.g., acknowledgment feedback) in uplink transmissions from the 20% of the UEs 115 that experience the various packet losses for different RLC PDUs reported as lost or unsuccessfully decoded, a base station 105 may be expected to retransmit the PDUs either in a broadcast or unicast transmission (e.g., based on implementation). When retransmitting the PDUs in a broadcast message using a G-RNTI, all the UEs 115 (e.g., 100% of the UEs 115) subscribed for the broadcast services and operations may decode the broadcast message (e.g., transmitted in a TB) and process the PDUs up to the RLC layer (e.g., RLC PDUs), where duplicate detection and discard can happen. For example, the PDUs may include L2 data for the UEs 115 that is processed at L2 of the UEs 115 (e.g., resulting in processing at the RLC layer). As such, even though a majority of the UEs 115 (e.g., 80%) are successful in fully decoding the PDUs initially, all of the UEs 115 may be expected to decode all downlink scheduling messaging and data until each UE 115 is able to decode the RLC PDUs successfully, thereby being a waste of broadband processing and power performance for the majority of the UEs 115.

As described herein, wireless communications system 100 may support efficient techniques for a UE 115 to selectively determine to decode PDUs (e.g., downlink scheduled data in a PDSCH transmission) based on whether the PDUs are a retransmission of an initial transmission of the PDUs (e.g., an initial multicast transmission). In some cases, a base station 105 may transmit an indication (e.g., in a PDCCH) to indicate if the PDUs are a multicast retransmission or a new multicast transmission. For example, the base station 105 may transmit a G-RNTI (e.g., a G-RNTI'), DCI with a retransmission indicator bit, or both to indicate if the PDUs are a retransmission. Additionally, the indication may be received at L1 of the UE 115, and the PDUs may be decoded at L1 of the UE 115 and sent to L2 of the UE 115 for further processing. Accordingly, if the initial transmission of the PDUs is successfully decoded, the UE 115 may refrain from decoding the PDUs if the indication signals the PDUs are a retransmission. Alternatively, if the initial transmission of the PDUs is not successfully decoded, the UE 115 may decode the PDUs if the indication signals the PDUs are the retransmission.

Figure 2:
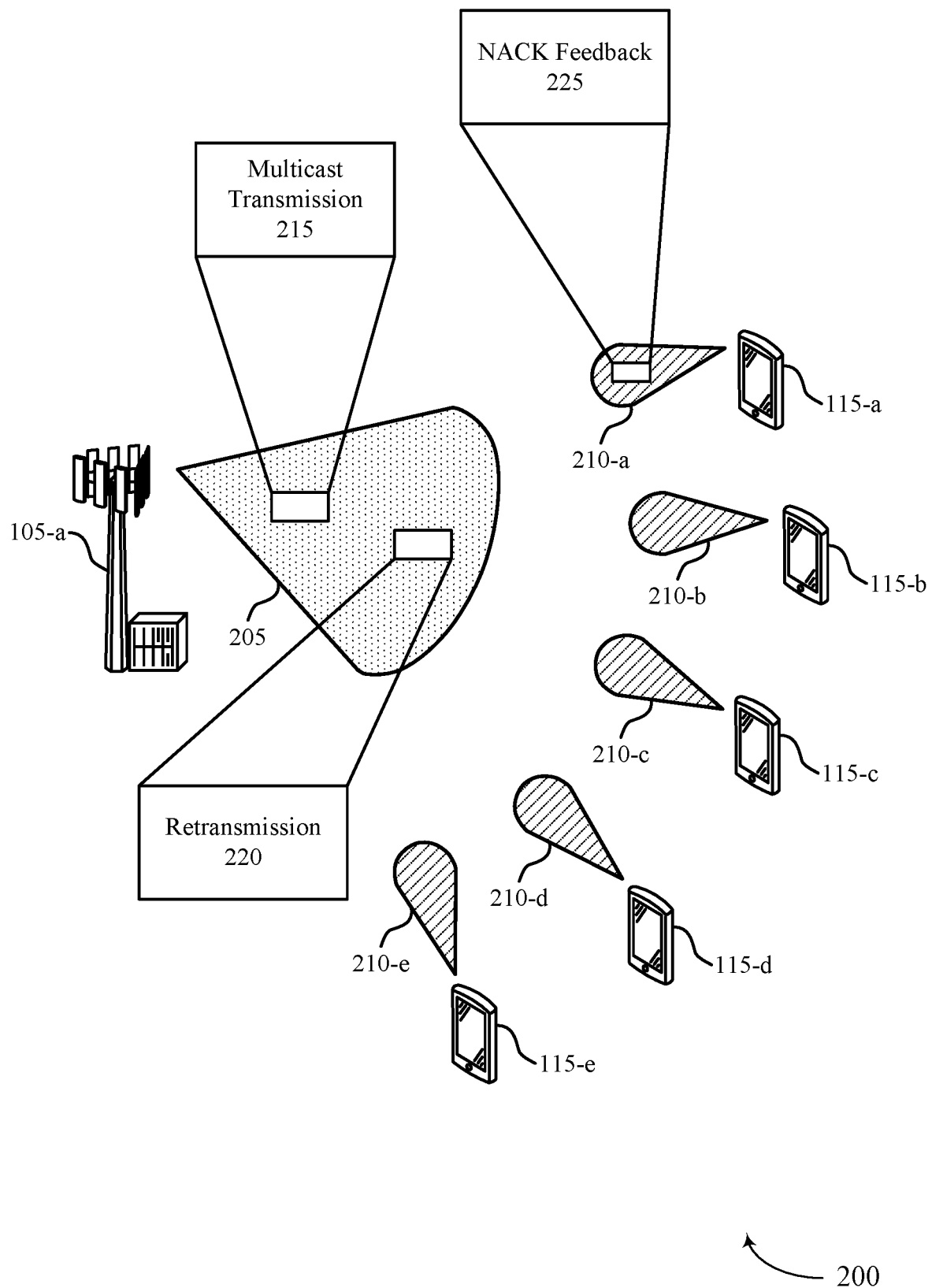
FIG. 2 illustrates an example of a wireless communications system that supports selective processing of multicast and broadcast retransmissions in accordance with aspects of the present disclosure.

FIG. 2 illustrates an example of a wireless communications system 200 that supports selective processing of multicast and broadcast retransmissions in accordance with aspects of the present disclosure. In some examples, wireless communications system 200 may implement aspects of wireless communications system 100. Wireless communications system 200 may include a base station 105-a that transmits data to multiple UEs 115 via a broadcast beam 205 (e.g., a multicast beam). For example, in the example of wireless communications system 200, a UE 115-a, a UE 115-b, a UE 115-c, a UE 115-d, and a UE 115-e may subscribe to broadcast services and operations from base station 105-a and may monitor for and receive downlink messages (e.g., including downlink data) via broadcast beam 205. Base station 105-a and the UEs 115 may be examples of corresponding base stations 105 and UEs 115, respectively, as described with reference to FIG. 1.

In some cases, base station 105-a may transmit downlink messages to the UEs 115 on MRBs and/or DRBs via broadcast beam 205. Additionally, the UEs 115 may then communicate with base station 105-a via respective beams 210 for each UE 115 (e.g., a beam 210-a for UE 115-a, a beam 210-b for UE 115-b, a beam 210-c for UE 115-c, a beam 210-d for UE 115-d, and a beam 210-e for UE 115-e). The beams 210 may be transmitted in a unicast manner from the UEs 115 directly to base station 105-a, or in another manner to be detected and received by base station 105-a. In some cases, base station 105-a may first transmit a multicast transmission 215 (e.g., initial transmission of PDUs) to the UEs 115 via broadcast beam 205, and then the UEs 115 may transmit an acknowledgment feedback message (e.g., HARQ ACK/NACK feedback message) on a respective beam 210 to indicate if the corresponding UE 115 successfully decoded the multicast transmission 215.

For example, UE 115-a may transmit a NACK feedback 225 on beam 210-a indicating that the multicast transmission 215 was unsuccessfully decoded by UE 115-a (e.g., acknowledgment feedback that carries a NACK for UE 115-a). Subsequently, based on receiving at least one NACK feedback message from at least one of the subscribed UEs 115, base station 105-a may determine to send a retransmission 220 of the multicast transmission 215. However, in some cases, the other UEs 115 subscribed to the broadcast services of base station 105-a may successfully decode the multicast transmission 215 (e.g., and send an ACK on a respective beam 210, refrain from transmitting a NACK, etc.). As such, if base station 105-a sends retransmission 220, the UEs 115 that successfully decoded the multicast transmission 215 on the initial transmission may not want to waste baseband processing resources and power performance having to process retransmission 220 to determine that retransmission 220 is a retransmission of data and information that has already been successfully received and decoded.

In some cases, UE 115-b, UE 115-c, UE 115-d, and UE 115-e may successfully decode the multicast transmission 215 when base station 105-a initially transmits the multicast transmission 215. Subsequently, when base station 105-a sends retransmission 220, UE 115-b, UE 115-c, UE 115-d, and UE 115-e may still perform decoding on retransmission 220 to determine the message is a retransmission and does not include additional information for UE 115-b, UE 115-c, UE 115-d, and UE 115-e, wasting unnecessary power and processing performance. For example, conventionally, the UEs 115 may receive an indication of downlink scheduled data (e.g., the retransmission 220) via L1 control channel signaling, but the L1 of the UEs 115 may not identify the contents of the incoming data. Based on receiving this downlink scheduled data, the UEs 115 may then turn on (e.g., wake up) L2 protocols and components (e.g., timers, processors, etc.) to monitor for, receive, and decode the incoming data to determine the contents of the incoming data. As such, the UEs 115 may use the L2 protocols and components to determine the incoming data is retransmission 220 rather than a new data transmission (e.g., additional multicast transmission), thereby wasting unnecessary power and processing performance associated with using the L2 protocols and components.

As described herein, base station 105-*a* may use an L2 retransmission purpose G-RNTI, such as a G-RNTI' (e.g., a specific G-RNTI to indicate a retransmission), to indicate that an upcoming downlink message is retransmission 220 (e.g., PDUs, data, downlink information, etc. previously transmitted in multicast transmission 215) to be decoded at L2 of the UEs 115. As such, the UEs 115 may selectively determine whether to decode or refrain from decoding the upcoming downlink scheduled data based on if the upcoming downlink scheduled data is retransmission 220 based on the G-RNTI'. For example, the UEs 115 may receive and decode the G-RNTI' initially at the L1 protocols and hardware to identify that the upcoming downlink scheduled data is retransmission 220. Subsequently, the UEs 115 that transmitted NACK feedback 225 and/or were unable to fully decode multicast transmission 215 may turn on the L2 protocols and components to then receive and decode data in retransmission 220 (e.g., the L1 protocols and hardware indicate to the L2 protocols and components to monitor for retransmission 220 based on receiving and decoding the G-RNTI'). Additionally, the UEs 115 that successfully decoded multicast transmission 215 in full at the initial transmission (e.g., or a previous transmission) may identify that the upcoming downlink scheduled data is a retransmission at the L1 protocols and hardware and may not turn on the L2 protocols and components, thereby saving power and processing performance for those UEs 115.

In some cases, base station 105-*a* may use the G-RNTI' meant for retransmission purposes and linked to a conventional G-RNTI that indicates an upcoming downlink data message is a broadcast data. For example, the conventional G-RNTI is used to schedule initial broadcast data such that UEs 115 subscribed to the broadcast services and operations may monitor for and receive the broadcasted data (e.g., multicast transmission 215, retransmission 220, etc.), while the G-RNTI' may be used more specifically to indicate whether corresponding broadcast data is retransmission 220 (e.g., for retransmission L2 PDU scheduling). Accordingly, a UE 115 may decode a PDCCH (e.g., a downlink control channel) to determine if the PDCCH includes a G-RNTI' that indicates whether a corresponding PDSCH (e.g., a downlink shared channel) associated with the PDCCH includes retransmission 220 and to determine whether to decode or refrain from decoding the PDSCH based on if the PDSCH is carrying retransmission 220 or not.

If no L2 NACK feedback messages are reported in uplink RLC status reports, the UEs 115 that did not report the L2 NACK feedback messages (e.g., 80% of users, such as UE 115-*b*, UE 115-*c*, UE 115-*d*, and UE 115-*e*) may safely ignore G-RNTI' based scheduling at the PHY level (e.g., L1). Additionally or alternatively, if L2 NACK feedback 225 is reported in an uplink RLC status report (e.g., RLC NACKs), the UEs 115 that did report NACK feedback 225 (e.g., 20% of the users, such as UE 115-*a*) may decode the G-RNTI' based broadcast scheduling to attempt to decode retransmission 220 broadcasted by base station 105-*a*. In some cases, an RLC AM of the UE(s) 115 that determine to decode retransmission 220 (e.g., reported NACK feedback 225, unsuccessfully decoded multicast transmission 215, etc.) may indicate the need to decode retransmission 220 broadcasted by base station 105-*a* or not using the G-RNTI' based scheduling at the PHY level (e.g., L1 to L2) depending on unsuccessfully decoding at least a portion of multicast transmission 215 (e.g., RLC NACK status PDUs). For example, the UEs 115 may use cross layer coordination to indicate whether to decode or refrain from decoding the broadcasted retransmission 220 (e.g., based on UE implementation).

In some cases, retransmission 220 may be intended to cover all UEs 115 subscribed to the broadcast services and operations, and, as such, portions of retransmission 220 (e.g., a subset of PDUs) decoded according to the G-RNTI' based scheduling may be discarded as duplicates for different UEs 115 based on respective individual unsuccessful decodings by the different UEs 115 (e.g., different RLC PDU losses). For example, UE 115-*a* may have unsuccessfully decoded a portion of multicast transmission 215, but base station 105-*a* may transmit the entire contents of multicast transmission 215 in retransmission 220 rather than the portions that were unsuccessfully decoded alone in case another UE 115 subscribed to the broadcast services and operations unsuccessfully decoded a different portion of multicast transmission 215 or the entirety of multicast transmission 215. Accordingly, UE 115-*a* may discard any duplicate information that was successfully decoded from the initial transmission of multicast transmission 215 when decoding retransmission 220.

The above described techniques where UE 115-*a* transmits NACK feedback 225 and then determines to decode retransmission 220 based on transmitting NACK feedback 225 and receiving and identifying the G-RNTI' may be used when UE 115-*a* is in a connected state (e.g., RRC_CONNECTED mode or state) and can transmit uplink feedback to base station 105-*a*. Alternatively, when in an idle or inactive state (e.g., RRC_IDLE or RRC INACTIVE mode or state) and there is no support for uplink feedback (e.g., transmitting RLC status PDU transmissions with NACK, such as NACK feedback 225), the RLC layer of UE 115-*a* may indicate to the PHY layer to decode the G-RNTI' based scheduling depending on the missing portions of multicast transmission 215 (e.g., L2 PDUs) at the RLC level. Accordingly, by having the RLC layer indicate whether to decode a retransmission 220, the power and performance of the UEs 115 that successfully decoded the multicast transmission may be improved when the UEs 115 are subscribed to multiple services. For example, if a UE 115 is subscribed to M services and N retransmissions are needed for all of the UEs 115 to fully decode a multicast transmission, the savings per UE 115 may be M*N decodings millions of instructions per second (MIPS) and power as well. In some cases, while the RLC layer is described for implementing the techniques of selectively receiving and decoding retransmission 220, different layers of the UEs 115 (e.g., such as the PDCP layer) may implement the techniques described herein.

Additionally or alternatively, base station 105-*a* may use a retransmission indicator bit (e.g., L2 retransmission indicator bit) in DCI to indicate that a multicast data is a retransmission 220 (e.g., in a PDCCH DCI). Accordingly, a UE 115 may not perform blind decodes for both G-RNTI and G-RNTI' but rather may use the retransmission indicator bit to determine whether to process downlink scheduled data based on if the retransmission indicator bit indicates the broadcast data carries retransmission 220 (e.g., in a received TB). For example, rather than determining if a G-RNTI or a G-RNTI' is received and determining that the retransmission 220 is sent based on receiving the G-RNTI', base station 105-*a* may transmit a G-RNTI and the retransmission indicator bit in a PDCCH DCI, and the UEs 115 may determine that the downlink scheduled data is the retransmission 220 broadcasted to the UEs 115 based on the retransmission indicator bit and the G-RNTI. That is, the G-RNTI may indicate data scheduled data is a broadcasted transmission, and the retransmission indicator bit (e.g., an extra bit) may indicate the scheduled data is a retransmission of a previously sent multicast transmission.

In some cases, the UE 115 may decode a first DCI using the G-RNTI' in addition to decoding a second DCI using the G-RNTI or may decode a same DCI using both the G-RNTI' and the G-RNTI. However, the UE 115 may be unable to decode both DCIs or to decode the DCI using both the G-RNTI' and the G-RNTI based on a power consumption or PDCCH decoding capability (e.g., poor connection, processing restrictions, etc.). If the UE 115 has a restriction of DCI decoding, the UE 115 may selectively decode the G-RNTI' when the UE 115 is unable to successfully decode a previous transmission (e.g., the multicast transmission 215) in full (e.g., has a NACK, transmits NACK feedback 225, RLC layer determines at least a portion is unsuccessfully decoded). In some cases, a DCI using the G-RNTI' may be associated with a DCI using a cell radio network temporary identifier (C-RNTI), and whenever the UE 115 monitors the DCI using the C-RNTI, the UE 115 may also monitor the DCI using the G-RNTI' (e.g., with a potentially low priority).

While five (5) UEs 115 are shown with reference to FIG. 2 as being subscribed to the broadcast services and operations with base station 105-*a*, it is to be understood that more or fewer UEs 115 may be connected to base station 105-*a* and subscribe to the broadcast services and operations. Additionally, while UE 115-*a* is shown as an example UE 115 that determines to decode a retransmission of a multicast transmission sent by base station 105-*a*, a higher number of UEs 115 may experience issues attempting to decode an initial multicast transmission and attempt to decode the retransmission accordingly.

Figure 3:
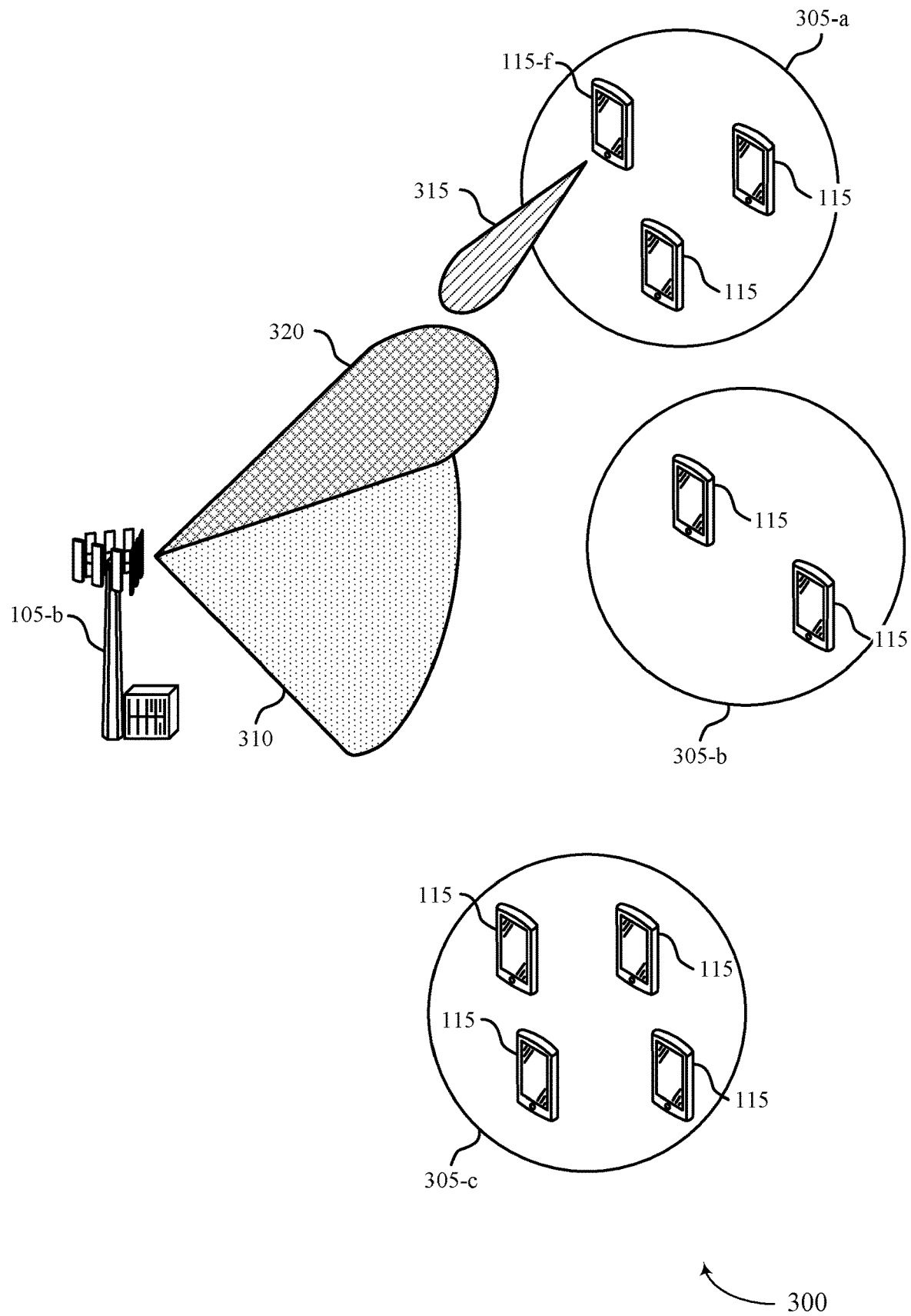
FIG. 3 illustrates an example of a grouping configuration that supports selective processing of multicast and broadcast retransmissions in accordance with aspects of the present disclosure.

FIG. 3 illustrates an example of a grouping configuration 300 that supports selective processing of multicast and broadcast retransmissions in accordance with aspects of the present disclosure. In some examples, grouping configuration 300 may implement aspects of wireless communications systems 100 and 200. Grouping configuration 300 may include a base station 105-*b* and one or more UEs 115, which may be examples of corresponding base stations 105 and UEs 115, respectively, as described with reference to FIGS. 1 and 2.

Additionally, as described herein, the UEs 115 may be subscribed to broadcast services and operations with base station 105-*b* and may receive downlink data from base station 105-*b* in multicast transmissions (e.g., broadcasted data) via a broadcast beam 310. As such, if a multicast data transmission is a retransmission of a previously transmitted downlink data transmission that a majority of the UEs 115 successfully decoded when the data was previously transmitted, the majority of the UEs 115 may not want to waste processing and power performance decoding a same data transmission already decoded and received. To prevent the majority of the UEs 115 from wasting processing and power performance, base station 105-*b* may transmit an indication of whether a multicast data transmission is a retransmission or not. For example, as described above with reference to FIG. 2, the indication may include a G-RNTI' configured to indicate whether the multicast data transmission includes a retransmission of data previously transmitted to a group of UEs 115.

In some cases, base station 105-*b* may configure multiple G-RNTI's for multiple UE subgroups 305. For example, the multiple G-RNTI's may be configured such that one G-RNTI' is allocated for a subgroup 305 of UEs 115 monitoring for a retransmission of a multicast transmission (e.g., broadcast transmission). As shown, base station 105-*b* may configure a first G-RNTI' for three (3) UEs 115 in a first subgroup 305-*a*, a second G-RNTI' for two (2) UEs 115 in a second subgroup 305-*b*, and a third G-RNTI' for four (4) UEs 115 in a third subgroup 305-*c*. That is, base station 105-*b* may configure a G-RNTI' set of $\{G_1', G_2', \ldots, G_n'\}$ for n subgroups 305 of UEs 115. While three (3) subgroups 305 of UEs 115 with varying numbers of UEs 115 each, it is to be understood that base station 105-*b* may configure more or fewer subgroups 305 with more or fewer UEs 115 in each subgroup 305.

For UEs 115 in a connected state (e.g., RRC_CONNECTED mode UEs 115), the configuration of the subgroups 305 may be based on UE CSI reports from the UEs 115 in terms of coverage, beam direction, etc. Additionally or alternatively, a subgroup 305 (e.g., UE group) may include UEs 115 in a same coverage, same reporting based on CSI, and/or PDCCH repetition. Accordingly, for a subgroup 305 with a higher SNR (e.g., CQI), base station 105-*b* may schedule a retransmission with a lower MCS and/or a higher number of PDCCH repetitions. Alternatively, for a subgroup 305 with a lower SNR (e.g., CQI), base station 105-*b* may schedule a retransmission with a higher MCS. In some cases, a subgroup 305 may include UEs 115 that use a same beam direction, report a same transmit beam ID, etc. Accordingly, for a subgroup 305 with a similar beam, base station 105-*b* may schedule the retransmission using a corresponding transmit beam.

Based on the subgroups 305, base station 105-*b* may send retransmissions for one of the subgroups 305 using an allocated G-RNTI' if one of the UEs 115 in the subgroup 305 sent a NACK feedback message. As such, the retransmission may be more efficient for the targeted subgroup 305 when compared to transmitting the retransmission to all of the subgroups 305. Additionally, the UE 115 that sent the NACK feedback message may monitor the allocated G-RNTI' for further power saving rather than all of the UEs 115 in the subgroup 305 monitoring for the allocated G-RNTI'. In some cases, a PDCCH with the allocated G-RNTI' for a corresponding subgroup 305 may be sent when at least one UE 115 in the same subgroup 305 sends the NACK feedback message, where the subgroup 305 has a less number of UEs 115 than of no grouping (e.g., 1/(number of groups)).

As shown, base station 105-*b* may send an initial multicast transmission via broadcast beam 310. A UE 115-*f* in the first subgroup 305-*a* may unsuccessfully decode the initial multicast transmission and may transmit a NACK feedback message on a beam 315 back to base station 105-*b*. Accordingly, base station 105-*b* may determine to retransmit the information originally carried in the initial multicast transmission. Subsequently, base station 105-*b* may send the retransmission on a beam 320 to the first subgroup 305-*a* rather than broadcasting the retransmission to all of the subgroups 305 and all of the UEs 115. Additionally, in some cases, UE 115-*f* may monitor for the G-RNTI' allocated to the first subgroup 305-*a* to identify and receive the retransmission, while the other UEs 115 in the first subgroup 305-*a* may ignore the G-RNTI' and not waste power and processing performance.

Figure 4:
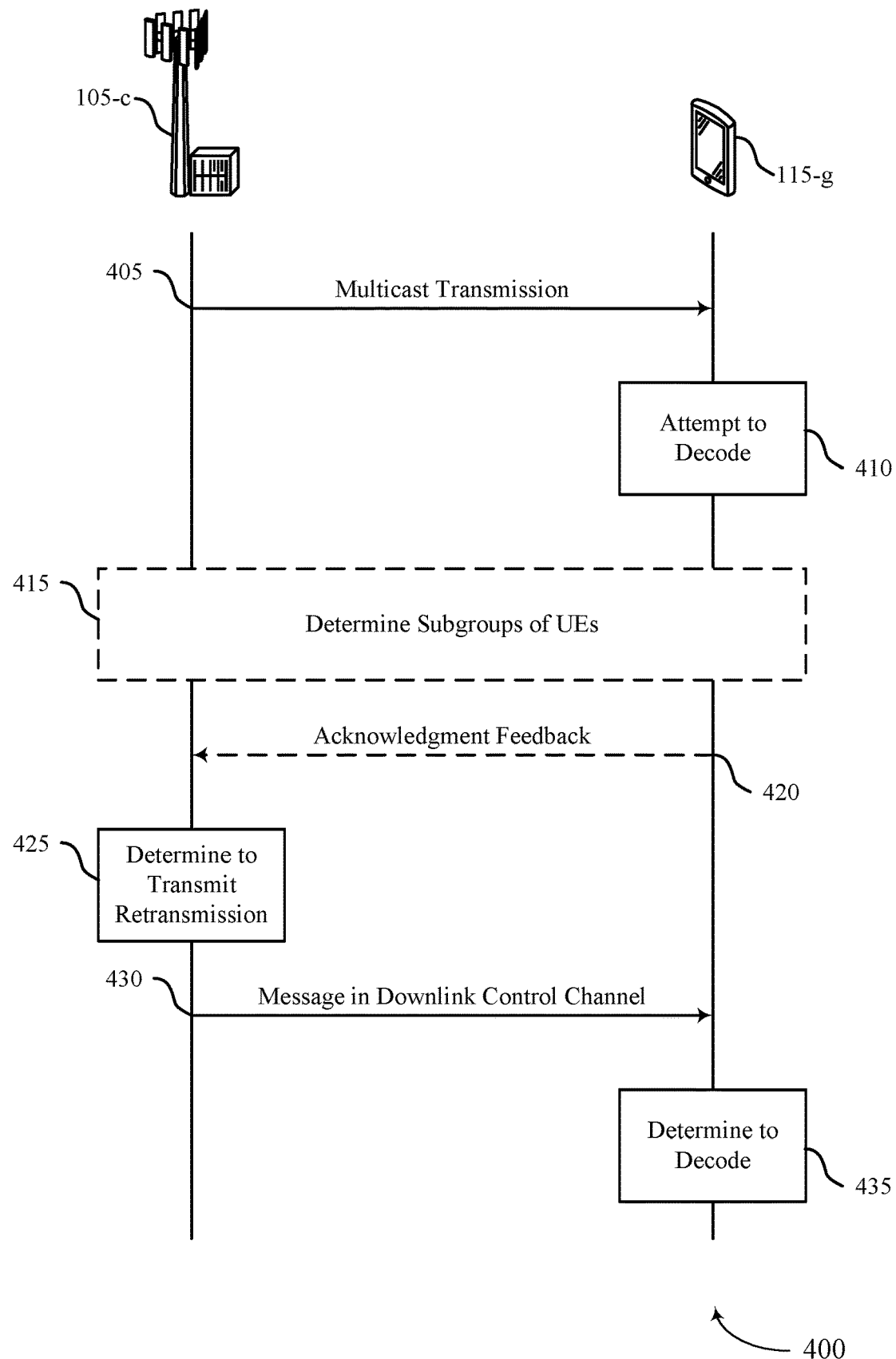
FIG. 4 illustrates an example of a process flow that supports selective processing of multicast and broadcast retransmissions in accordance with aspects of the present disclosure.

FIG. 4 illustrates an example of a process flow 400 that supports selective processing of multicast and broadcast retransmissions in accordance with aspects of the present disclosure. In some examples, process flow 400 may implement aspects of wireless communications systems 100 and 200. Process flow 400 may include a base station 105-*c* and a UE 115-*g*, which may be examples of corresponding base stations 105 and UEs 115, respectively, as described with reference to FIGS. 1-3. Additionally, UE 115-*g* may subscribe to broadcast services and operations from base station 105-*c* (e.g., to receive broadcast and/or multicast transmissions).

In the following description of the process flow 400, the operations between base station 105-*c* and UE 115-*g* may be transmitted in a different order than the exemplary order shown, or the operations performed by base station 105-*c* and UE 115-*g* may be performed in different orders or at different times. Certain operations may also be left out of the process flow 400, or other operations may be added to the process flow 400. It is to be understood that while base station 105-*c* and UE 115-*g* are shown performing a number of the operations of the process flow 400, any wireless device may perform the operations shown.

At 405, UE 115-*g* may receive, from base station 105-*c*, a multicast transmission, where the multicast transmission is transmitted to a set of UEs 115 that includes UE 115-*g*. For example, the multicast transmission may include downlink scheduled data for the set of UEs 115.

At 410, UE 115-*g* may attempt to decode the multicast transmission (e.g., and the scheduled downlink data).

At 415, base station 105-*c* may determine multiple subgroups of UEs 115 for the set of UEs 115 based on coverage, CSI, downlink control channel repetitions (e.g., PDCCH repetitions), an SNR, a CQI, a beam direction, a transmit beam ID, or a combination thereof for UEs 115 in each subgroup of the multiple subgroups of UEs 115. In some cases, base station 105-*c* may indicate these subgroups to the set of UEs 115.

At 420, UE 115-*g* may transmit, to base station 105-*c*, an acknowledgment feedback message based on attempting to decode the multicast transmission. For example, UE 115-*g* may transmit, to base station 105-*c*, a NACK feedback message based on unsuccessfully decoding the multicast transmission. Additionally, the acknowledgment feedback message may be transmitted based on UE 115-*g* being in a connected state.

In some cases, base station 105-*c* may receive, from at least one UE 115 (e.g., UE 115-*g*) of the set of UEs 115, a NACK feedback message indicating that the multicast transmission is unsuccessfully decoded. In some examples, base station 105-*c* may receive, from at least one UE 115 in one subgroup of the multiple subgroups of UEs 115, a NACK feedback message indicating that the multicast transmission is unsuccessfully decoded.

At 425, base station 105-*c* may determine to transmit a retransmission of the multicast transmission. For example, base station 105-*c* may determine to retransmit the scheduled downlink data (e.g., in the retransmission) that was initially sent in the multicast transmission.

At 430, UE 115-*g* may receive, from base station 105-*c*, a message in a downlink control channel (e.g., a PDCCH), the message indicating that a downlink shared channel (e.g., a PDSCH) transmission is a retransmission of the multicast transmission. For example, the message may indicate that the downlink scheduled data transmitted in the downlink shared channel transmission is a retransmission of the downlink scheduled data transmitted in the multicast transmission. In some cases, UE 115-*g* may determine the message is allocated for a subgroup of UEs 115 for the set of UEs 115, where the subgroup of UEs 115 includes UE 115-*g*. Additionally, the subgroup of UEs 115 may be one subgroup of a set of subgroups of UEs 115, each subgroup of the set of subgroups of UEs 115 being based on coverage, CSI (e.g., CSI reports), downlink control channel repetitions, an SNR, a CQI, a beam direction, a transmit beam identifier, or a combination thereof for UEs 115 in each subgroup.

In some cases, base station 105-*c* may transmit the retransmission of the multicast transmission (e.g., retransmit the downlink scheduled data) in the downlink shared channel transmission based on the NACK feedback message. Additionally, the message may include a first G-RNTI (e.g., G-RNTI') indicating the retransmission of the multicast transmission or a retransmission indicator bit in DCI. In some cases, base station 105-*c* may transmit the retransmission of the multicast transmission in the downlink shared channel transmission to at least one subgroup of UEs. For example, base station 105-*c* may transmit, to the one subgroup, the retransmission of the multicast transmission in the downlink shared channel transmission based on the NACK feedback message.

At 435, UE 115-*g* may determine whether to decode the downlink shared channel transmission based on the message (e.g., indicating the retransmission is carrying the downlink scheduled data previously sent in the multicast transmission). For example, UE 115-*g* may determine to decode or to refrain from decoding the downlink shared channel transmission based on the message including the first G-RNTI (e.g., G-RNTI') indicating the retransmission of the multicast transmission or a retransmission indicator bit in DCI. In some cases, the message in the downlink control channel may be received at an L1 of the UE, and the downlink shared channel transmission may be decoded at the L1 of the UE and sent to an L2 of the UE for processing.

In some cases, UE 115-*g* may refrain from decoding the downlink shared channel transmission based on the message indicating the downlink shared channel transmission is the retransmission of the multicast transmission (e.g., based on the downlink scheduled data from the multicast transmission being retransmitted in the downlink shared channel transmission), where the multicast transmission is successfully decoded. Alternatively, UE 115-*g* may decode the downlink shared channel transmission based on the message indicating the downlink shared channel transmission (e.g., the downlink scheduled data) is the retransmission of the multicast transmission, where the multicast transmission is unsuccessfully decoded.

In some cases, UE 115-*g* may refrain from decoding the downlink shared channel transmission based on the acknowledgment feedback message indicating the multicast transmission is successfully decoded by the UE (e.g., an ACK) and the message indicating the downlink shared channel transmission (e.g., the downlink scheduled data) is the retransmission of the multicast transmission. Alternatively, UE 115-*g* may decode the downlink shared channel transmission based on the acknowledgment feedback message indicating the multicast transmission is unsuccessfully decoded by the UE (e.g., a NACK) and the message indicating the downlink shared channel transmission (e.g., the downlink scheduled data) is the retransmission of the multicast transmission.

In some cases, UE 115-g may determine that at least a portion of the multicast transmission is unsuccessfully decoded (e.g., partial PDU packet loss, at least a portion of the downlink scheduled data is not decoded). Subsequently, UE 115-g may decode the downlink shared channel transmission based on the determination and the message indicating the downlink shared channel transmission is the retransmission of the multicast transmission (e.g., the downlink scheduled data). In some cases, the determination that at least the portion of the multicast transmission is unsuccessfully decoded may be made at the RLC layer of UE 115-g and may be based on being in an idle or inactive state. Additionally or alternatively, the determination that at least the portion of the multicast transmission is unsuccessfully decoded may be made at a different layer of UE 115-g (e.g., such as the PDCP layer) and may be based on being in an idle or inactive state.

Additionally or alternatively, UE 115-g may decode first DCI using the first G-RNTI' indicating the retransmission of the multicast transmission and may decode second DCI using a second G-RNTI indicating an additional multicast transmission, where the determination to decode or to refrain from decoding the downlink shared channel transmission is based on the first DCI, the second DCI, or a combination thereof. In some cases, the first DCI and the second DCI may be decoded based on a processing parameter of UE.

In some cases, UE 115-g may decode first DCI using the first G-RNTI indicating the retransmission of the multicast transmission (e.g., G-RNTI') based on transmitting the NACK feedback message. Additionally, the first DCI and the first G-RNTI may be associated with a second DCI and a C-RNTI, and the first DCI may be monitored using the first G-RNTI based on monitoring the second DCI using the C-RNTI. In some cases, UE 115-g may decode the downlink shared channel transmission based on the message being allocated to the subgroup of UEs and the message indicating the downlink shared transmission is the retransmission of the multicast transmission.

Figure 5:
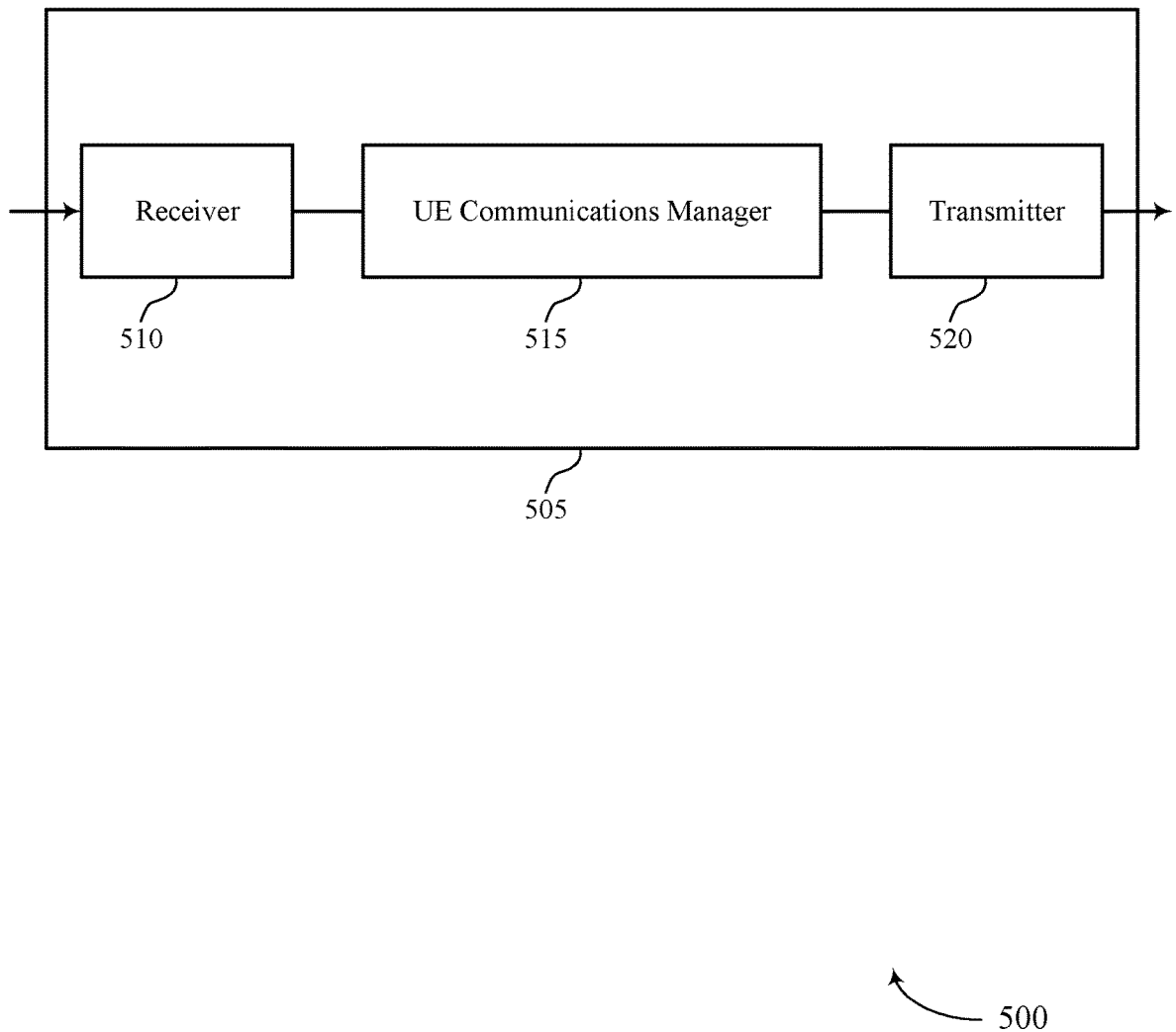
FIGS. 5 and 6 show block diagrams of devices that support selective processing of multicast and broadcast retransmissions in accordance with aspects of the present disclosure.

FIG. 5 shows a block diagram 500 of a device 505 that supports selective processing of multicast and broadcast retransmissions in accordance with aspects of the present disclosure. The device 505 may be an example of aspects of a UE 115 as described herein. The device 505 may include a receiver 510, a UE communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to selective processing of multicast and broadcast retransmissions, etc.). Information may be passed on to other components of the device 505. The receiver 510 may be an example of aspects of the transceiver 820 described with reference to FIG. 8. The receiver 510 may utilize a single antenna or a set of antennas.

The UE communications manager 515 may receive, from a base station, a multicast transmission, where the multicast transmission is transmitted to a set of UEs that includes the UE. In some cases, the UE communications manager 515 may attempt to decode the multicast transmission. Additionally, the UE communications manager 515 may receive, from the base station, a message in a downlink control channel (e.g., PDCCH), the message indicating that a downlink shared channel transmission (e.g., PDSCH) is a retransmission of the multicast transmission. Subsequently, the UE communications manager 515 may determine whether to decode the downlink shared channel transmission based on the message. The UE communications manager 515 may be an example of aspects of the UE communications manager 810 described herein.

The UE communications manager 515, or its sub-components, may be implemented in hardware, code (e.g., software or firmware) executed by a processor, or any combination thereof. If implemented in code executed by a processor, the functions of the UE communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 515, or its sub-components, may be physically located at various positions, including being distributed such that portions of functions are implemented at different physical locations by one or more physical components. In some examples, the UE communications manager 515, or its sub-components, may be a separate and distinct component in accordance with various aspects of the present disclosure. In some examples, the UE communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
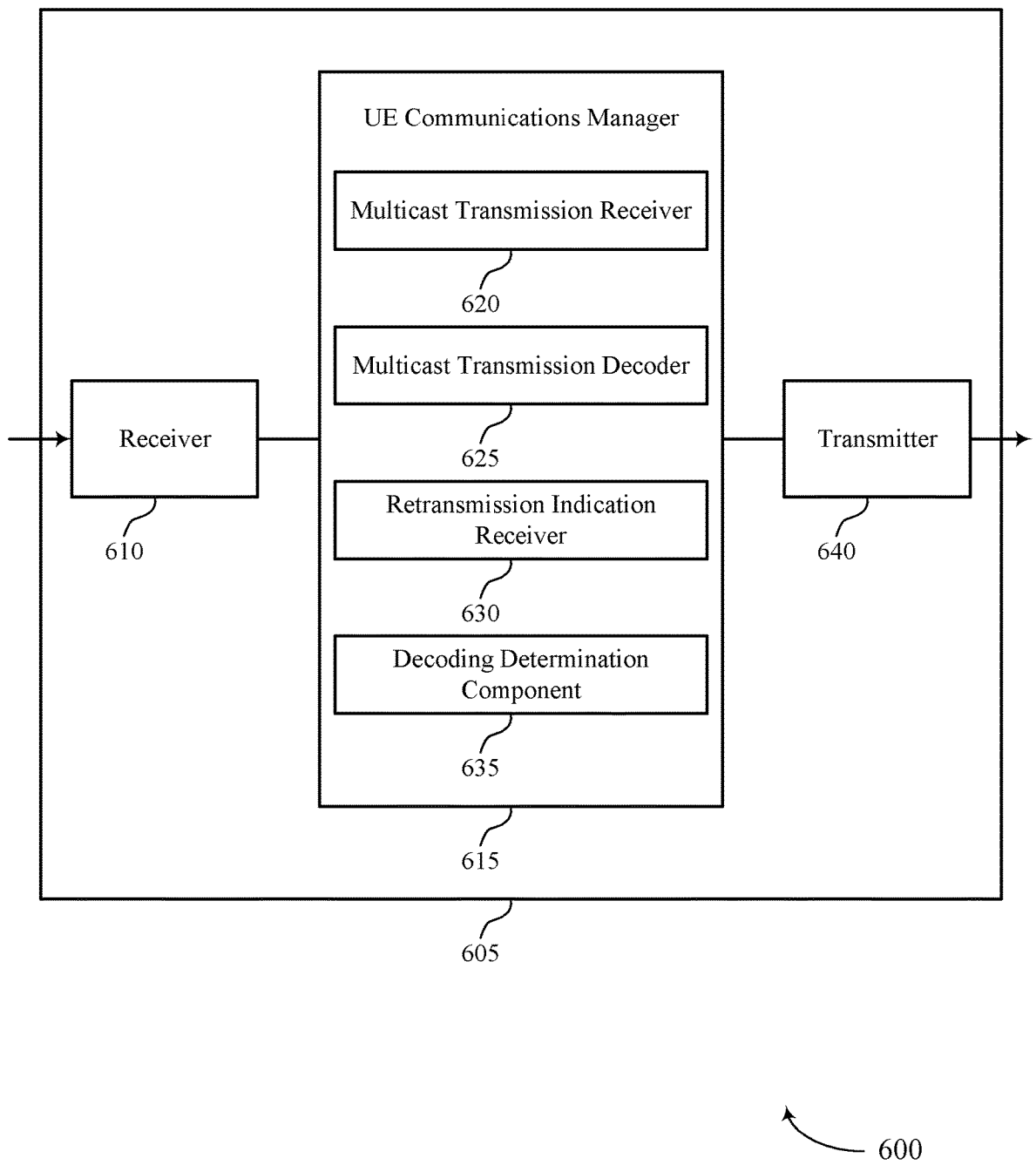

FIG. 6 shows a block diagram 600 of a device 605 that supports selective processing of multicast and broadcast retransmissions in accordance with aspects of the present disclosure. The device 605 may be an example of aspects of a device 505, or a UE 115 as described herein. The device 605 may include a receiver 610, a UE communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to selective processing of multicast and broadcast retransmissions, etc.). Information may be passed on to other components of the device 605. The receiver 610 may be an example of aspects of the transceiver 820 described with reference to FIG. 8. The receiver 610 may utilize a single antenna or a set of antennas.

The UE communications manager 615 may be an example of aspects of the UE communications manager 515 as described herein. The UE communications manager 615 may include a multicast transmission receiver 620, a multicast transmission decoder 625, a retransmission indication receiver 630, and a decoding determination component 635. The UE communications manager 615 may be an example of aspects of the UE communications manager 810 described herein.

The multicast transmission receiver 620 may receive, from a base station, a multicast transmission, where the multicast transmission is transmitted to a set of UEs that includes the UE.

The multicast transmission decoder 625 may attempt to decode the multicast transmission.

The retransmission indication receiver 630 may receive, from the base station, a message in a downlink control channel, the message indicating that a downlink shared channel transmission is a retransmission of the multicast transmission.

The decoding determination component 635 may determine whether to decode the downlink shared channel transmission based on the message.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
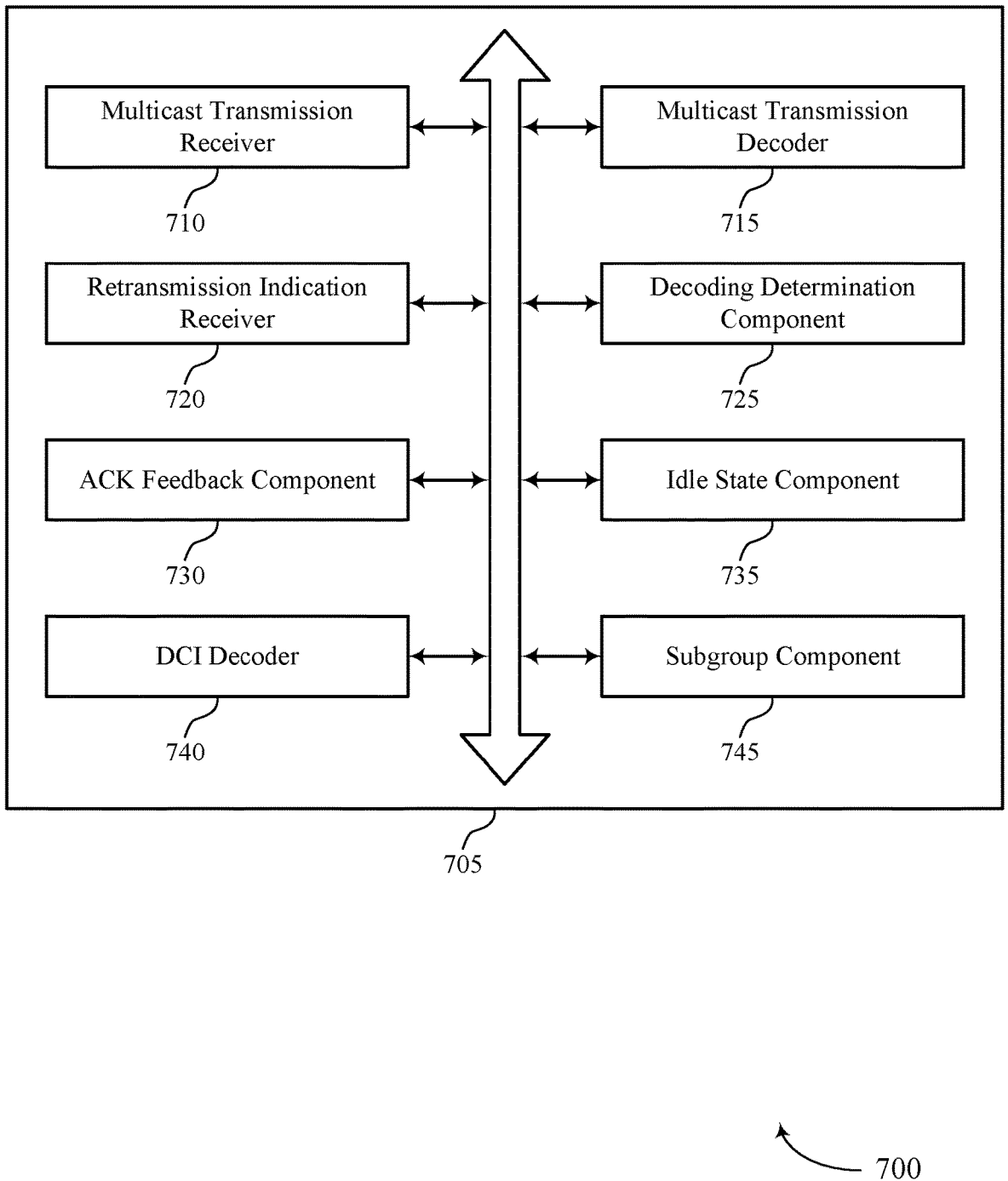
FIG. 7 shows a block diagram of a user equipment (UE) communications manager that supports selective processing of multicast and broadcast retransmissions in accordance with aspects of the present disclosure.

FIG. 7 shows a block diagram 700 of a UE communications manager 705 that supports selective processing of multicast and broadcast retransmissions in accordance with aspects of the present disclosure. The UE communications manager 705 may be an example of aspects of a UE communications manager 515, a UE communications manager 615, or a UE communications manager 810 described herein. The UE communications manager 705 may include a multicast transmission receiver 710, a multicast transmission decoder 715, a retransmission indication receiver 720, a decoding determination component 725, an ACK feedback component 730, an idle state component 735, a DCI decoder 740, and a subgroup component 745. Each of these modules may communicate, directly or indirectly, with one another (e.g., via one or more buses).

The multicast transmission receiver 710 may receive, from a base station, a multicast transmission, where the multicast transmission is transmitted to a set of UEs that includes the UE.

The multicast transmission decoder 715 may attempt to decode the multicast transmission.

The retransmission indication receiver 720 may receive, from the base station, a message in a downlink control channel, the message indicating that a downlink shared channel transmission is a retransmission of the multicast transmission. In some cases, the message in the downlink control channel may be received at an L1 of the UE, and the downlink shared channel transmission may be decoded at the L1 of the UE and sent to an L2 of the UE for processing.

The decoding determination component 725 may determine whether to decode the downlink shared channel transmission based on the message. In some examples, the decoding determination component 725 may determine to decode or to refrain from decoding the downlink shared channel transmission based on the message including a first G-RNTI indicating the retransmission of the multicast transmission or a retransmission indicator bit in downlink control information. For example, the decoding determination component 725 may refrain from decoding the downlink shared channel transmission based on the message indicating the downlink shared channel transmission is the retransmission of the multicast transmission, where the multicast transmission is successfully decoded. Additionally or alternatively, the decoding determination component 725 may decode the downlink shared channel transmission based on the message indicating the downlink shared channel transmission is the retransmission of the multicast transmission, where the multicast transmission is unsuccessfully decoded.

The ACK feedback component 730 may transmit, to the base station, an acknowledgment feedback message based on decoding the multicast transmission. In some examples, the ACK feedback component 730 may refrain from decoding the downlink shared channel transmission based on the acknowledgment feedback message indicating the multicast transmission is successfully decoded by the UE (e.g., an ACK) and the message indicating the downlink shared channel transmission is the retransmission of the multicast transmission. Additionally or alternatively, the ACK feedback component 730 may decode the downlink shared channel transmission based on the acknowledgment feedback message indicating the multicast transmission is unsuccessfully decoded by the UE (e.g., a NACK) and the message indicating the downlink shared channel transmission is the retransmission of the multicast transmission. In some cases, the acknowledgment feedback may be transmitted based on being in a connected state.

The idle state component 735 may determine that at least a portion of the multicast transmission is unsuccessfully decoded and may decode the downlink shared channel transmission based on the determination and the message indicating the downlink shared channel transmission is the retransmission of the multicast transmission. In some cases, the determination that at least the portion of the multicast transmission is unsuccessfully decoded may be made at an RLC layer of the UE and may be based on being in an idle or inactive state.

The DCI decoder 740 may decode first DCI using a first G-RNTI indicating the retransmission of the multicast transmission and may decode second DCI using a second G-RNTI indicating an additional multicast transmission, where the determination on whether to decode the downlink shared channel transmission is based on the first DCI, the second DCI, or a combination thereof. In some cases, the first DCI and the second DCI may be decoded based on a processing parameter of the UE.

In some examples, the DCI decoder 740 may transmit, to the base station, a NACK feedback message based on unsuccessfully decoding the multicast transmission and may decode first DCI using a first G-RNTI indicating the retransmission of the multicast transmission based on transmitting the NACK feedback message. In some cases, the first DCI and the first G-RNTI may be associated with a second DCI and a C-RNTO, and the first DCI may be monitored using the first G-RNTI based on monitoring the second DCI using the C-RNTI.

The subgroup component 745 may determine the message is allocated for a subgroup of UEs for the set of UEs, where the subgroup of UEs includes the UE. In some examples, the subgroup component 745 may decode the downlink shared channel transmission based on the message being allocated to the subgroup of UEs and the message indicating the downlink shared transmission is the retransmission of the multicast transmission. Additionally, the subgroup of UEs may be determined based on CSI reports from the set of UEs. For example, the subgroup of UEs may be one subgroup of a set of subgroups of UEs, where each subgroup of the set of subgroups of UEs is based on coverage, CSI, downlink control channel repetitions (e.g., PDCCH repetitions), an SNR, a CQI, a beam direction, a transmit beam identifier, or a combination thereof for UEs in each subgroup.

Figure 8:
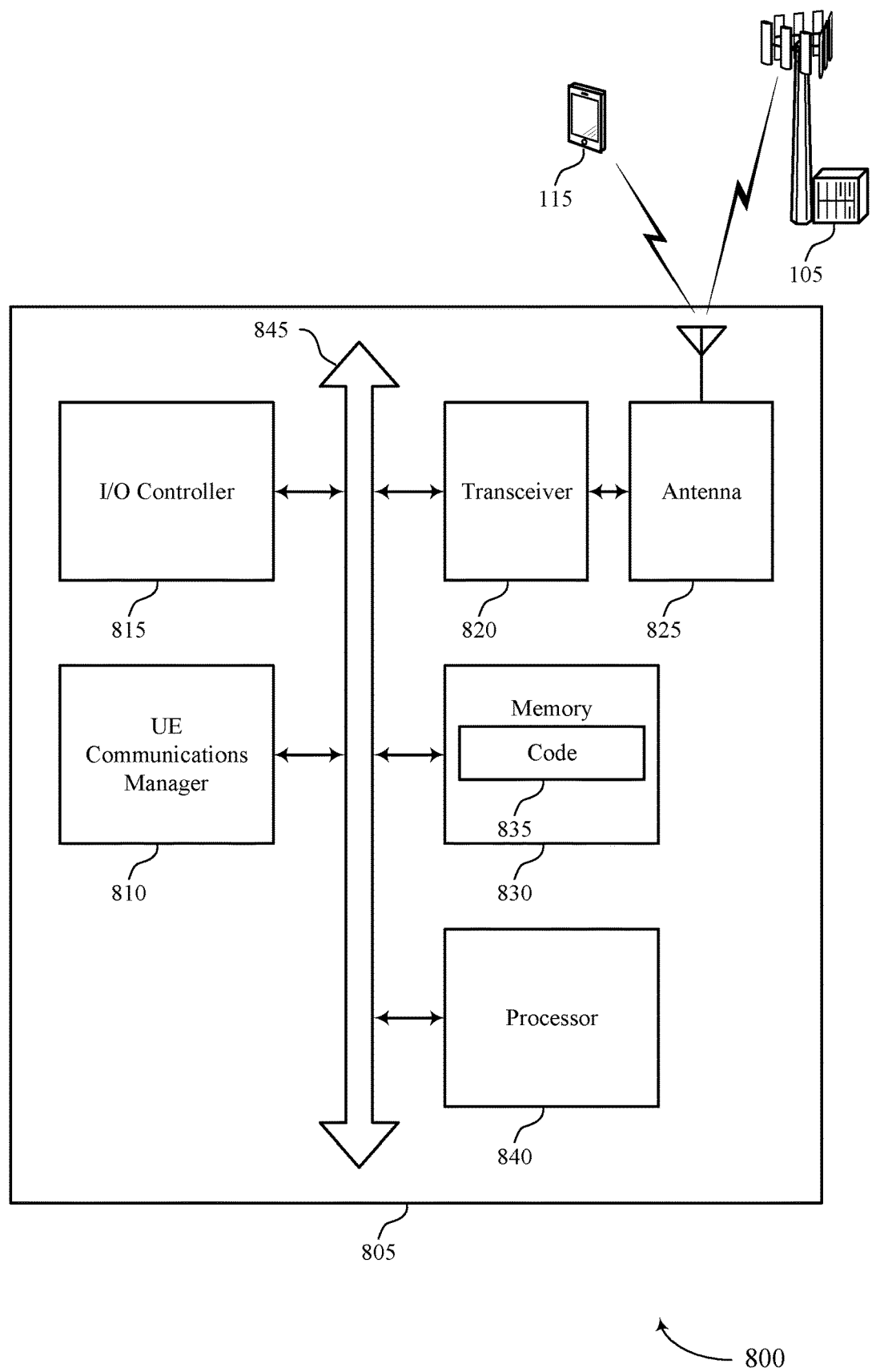
FIG. 8 shows a diagram of a system including a device that supports selective processing of multicast and broadcast retransmissions in accordance with aspects of the present disclosure.

FIG. 8 shows a diagram of a system 800 including a device 805 that supports selective processing of multicast and broadcast retransmissions in accordance with aspects of the present disclosure. The device 805 may be an example of or include the components of device 505, device 605, or a UE 115 as described herein. The device 805 may include components for bi-directional voice and data communications including components for transmitting and receiving communications, including a UE communications manager 810, an I/O controller 815, a transceiver 820, an antenna 825, memory 830, and a processor 840. These components may be in electronic communication via one or more buses (e.g., bus 845).

The UE communications manager 810 may receive, from a base station, a multicast transmission, where the multicast transmission is transmitted to a set of UEs that includes the UE. In some cases, the UE communications manager 810 may attempt to decode the multicast transmission. Additionally, the UE communications manager 810 may receive, from the base station, a message in a downlink control channel, the message indicating that a downlink shared channel transmission is a retransmission of the multicast transmission. Subsequently, the UE communications manager 810 may determine whether to decode the downlink shared channel transmission based on the message.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting selective processing of multicast and broadcast retransmissions).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
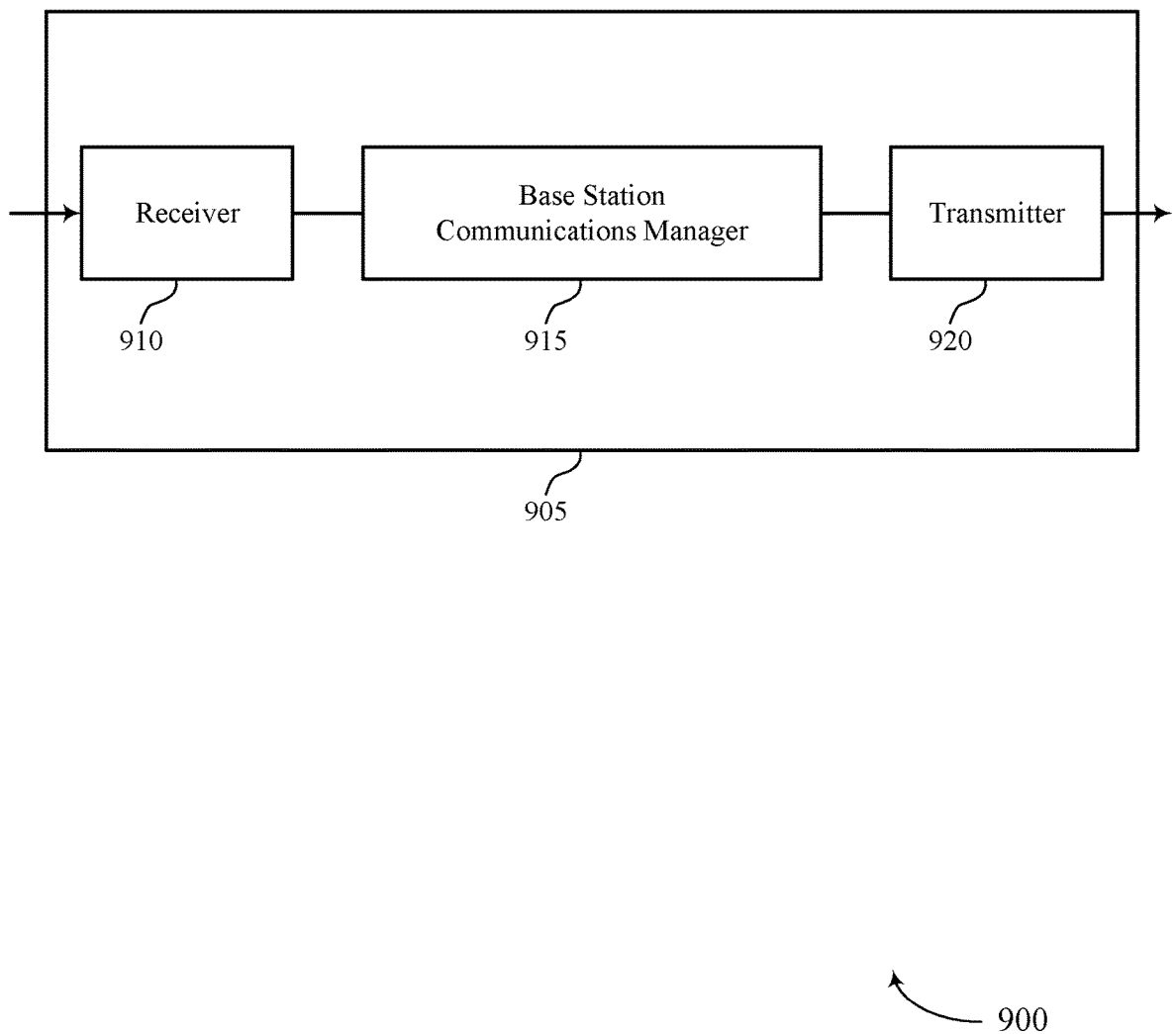
FIGS. 9 and 10 show block diagrams of devices that support selective processing of multicast and broadcast retransmissions in accordance with aspects of the present disclosure.

FIG. 9 shows a block diagram 900 of a device 905 that supports selective processing of multicast and broadcast retransmissions in accordance with aspects of the present disclosure. The device 905 may be an example of aspects of a base station 105 as described herein. The device 905 may include a receiver 910, a base station communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to selective processing of multicast and broadcast retransmissions, etc.). Information may be passed on to other components of the device 905. The receiver 910 may be an example of aspects of the transceiver 1220 described with reference to FIG. 12. The receiver 910 may utilize a single antenna or a set of antennas.

The base station communications manager 915 may transmit, to a set of UEs, a multicast transmission. In some cases, the base station communications manager 915 may determine to transmit a retransmission of the multicast transmission. Subsequently, the base station communications manager 915 may transmit a message in a downlink control channel (e.g., a PDCCH), the message indicating that a downlink shared channel (e.g., a PDSCH) transmission is the retransmission of the multicast transmission. The base station communications manager 915 may be an example of aspects of the base station communications manager 1210 described herein.

The base station communications manager 915, or its sub-components, may be implemented in hardware, code (e.g., software or firmware) executed by a processor, or any combination thereof. If implemented in code executed by a processor, the functions of the base station communications manager 915, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The base station communications manager 915, or its sub-components, may be physically located at various positions, including being distributed such that portions of functions are implemented at different physical locations by one or more physical components. In some examples, the base station communications manager 915, or its sub-components, may be a separate and distinct component in accordance with various aspects of the present disclosure. In some examples, the base station communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
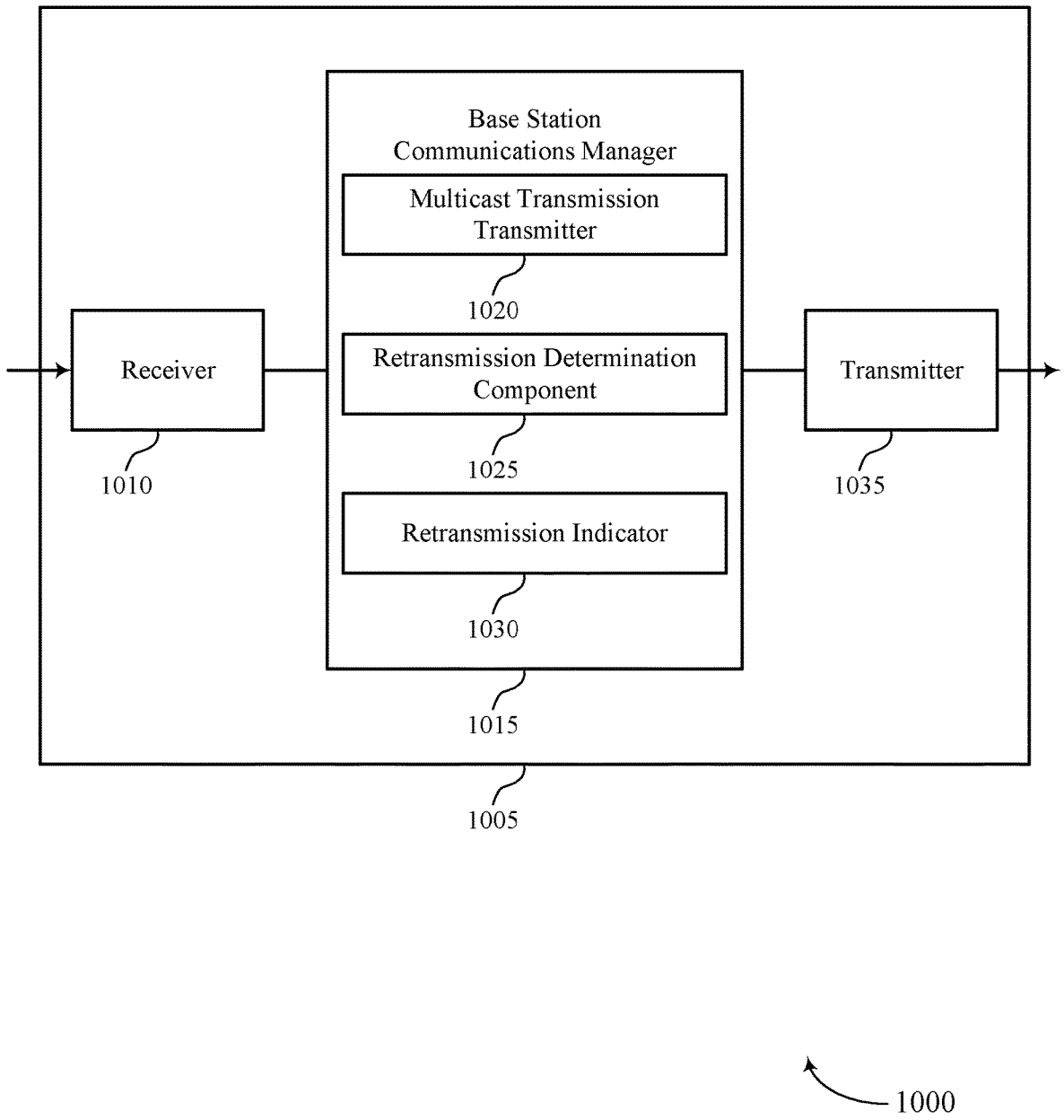

FIG. 10 shows a block diagram 1000 of a device 1005 that supports selective processing of multicast and broadcast retransmissions in accordance with aspects of the present disclosure. The device 1005 may be an example of aspects of a device 905, or a base station 105 as described herein. The device 1005 may include a receiver 1010, a base station communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to selective processing of multicast and broadcast retransmissions, etc.). Information may be passed on to other components of the device 1005. The receiver 1010 may be an example of aspects of the transceiver 1220 described with reference to FIG. 12. The receiver 1010 may utilize a single antenna or a set of antennas.

The base station communications manager 1015 may be an example of aspects of the base station communications manager 915 as described herein. The base station communications manager 1015 may include a multicast transmission transmitter 1020, a retransmission determination component 1025, and a retransmission indicator 1030. The base station communications manager 1015 may be an example of aspects of the base station communications manager 1210 described herein.

The multicast transmission transmitter 1020 may transmit, to a set of UEs, a multicast transmission.

The retransmission determination component 1025 may determine to transmit a retransmission of the multicast transmission.

The retransmission indicator 1030 may transmit a message in a downlink control channel, the message indicating that a downlink shared channel transmission is the retransmission of the multicast transmission.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
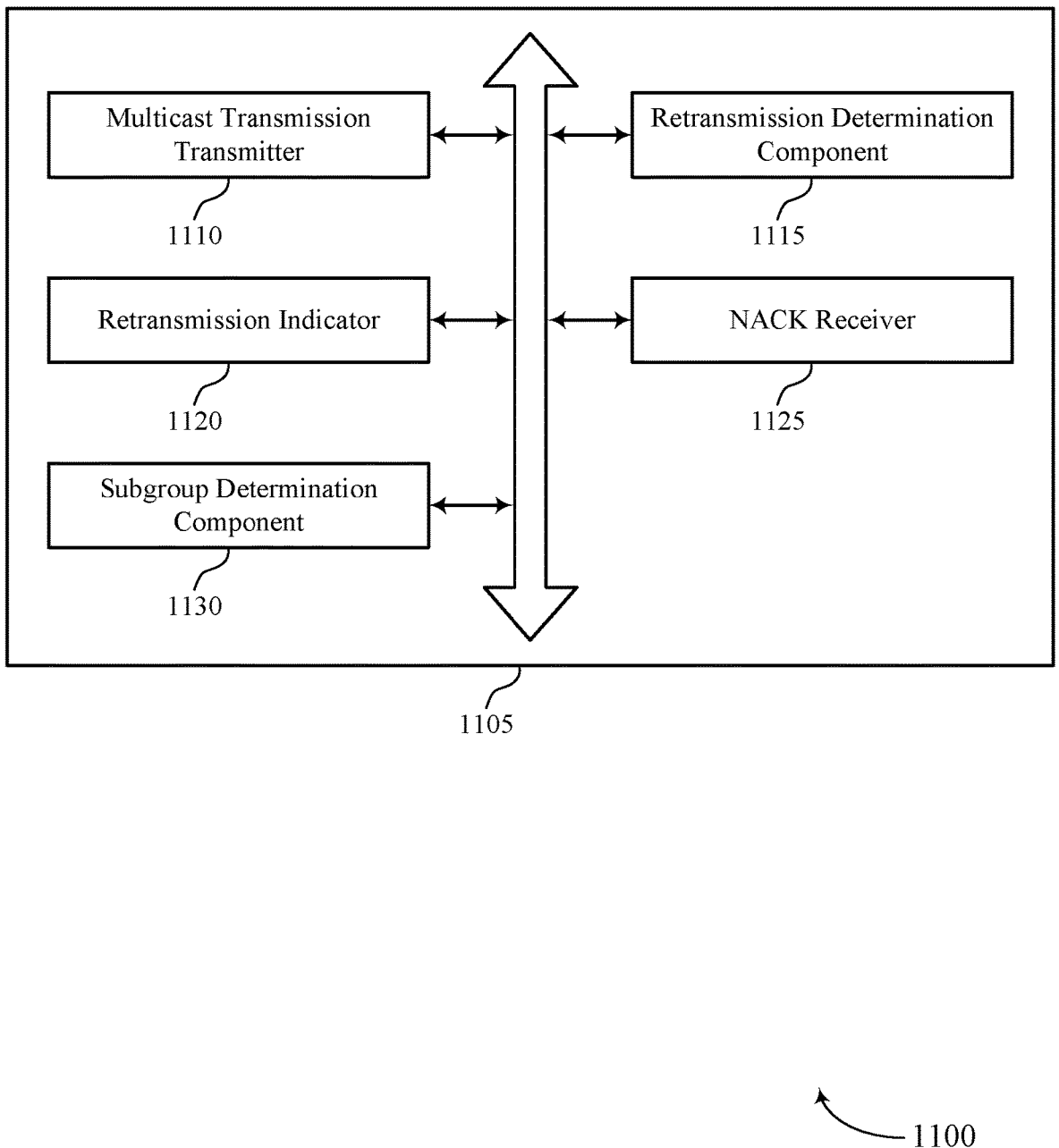
FIG. 11 shows a block diagram of a base station communications manager that supports selective processing of multicast and broadcast retransmissions in accordance with aspects of the present disclosure.

FIG. 11 shows a block diagram 1100 of a base station communications manager 1105 that supports selective processing of multicast and broadcast retransmissions in accordance with aspects of the present disclosure. The base station communications manager 1105 may be an example of aspects of a base station communications manager 915, a base station communications manager 1015, or a base station communications manager 1210 described herein. The base station communications manager 1105 may include a multicast transmission transmitter 1110, a retransmission determination component 1115, a retransmission indicator 1120, a NACK receiver 1125, and a subgroup determination component 1130. Each of these modules may communicate, directly or indirectly, with one another (e.g., via one or more buses).

The multicast transmission transmitter 1110 may transmit, to a set of UEs, a multicast transmission.

The retransmission determination component 1115 may determine to transmit a retransmission of the multicast transmission.

The retransmission indicator 1120 may transmit a message in a downlink control channel, the message indicating that a downlink shared channel transmission is the retransmission of the multicast transmission. In some cases, the message may include a first G-RNTI indicating the retransmission of the multicast transmission or a retransmission indicator bit in DCI. Additionally, the message in the downlink control channel may be transmitted to an L1 of the set of UEs, and the downlink shared channel transmission may be transmitted over the L1 to the set of UEs containing L2 data packets.

The NACK receiver 1125 may receive, from at least one UE of the set of UEs, a NACK feedback message indicating that the multicast transmission is unsuccessfully decoded. In some examples, the NACK receiver 1125 may transmit the retransmission of the multicast transmission in the downlink shared channel transmission based on the NACK feedback message.

The subgroup determination component 1130 may determine multiple subgroups of UEs for the set of UEs based on coverage, CSI, downlink control channel repetitions (e.g., PDCCH repetitions), an SNR, a CQI, a beam direction, a transmit beam identifier, or a combination thereof for UEs in each subgroup of the multiple subgroups of UEs. In some examples, the subgroup determination component 1130 may transmit the retransmission of the multicast transmission in the downlink shared channel transmission to at least one subgroup of UEs. Additionally, the subgroup determination component 1130 may receive, from at least one UE in one subgroup of the multiple subgroups of UEs, a NACK feedback message indicating that the multicast transmission is unsuccessfully decoded and may transmit, to the one subgroup, the retransmission of the multicast transmission in the downlink shared channel transmission based on the NACK feedback message.

Figure 12:
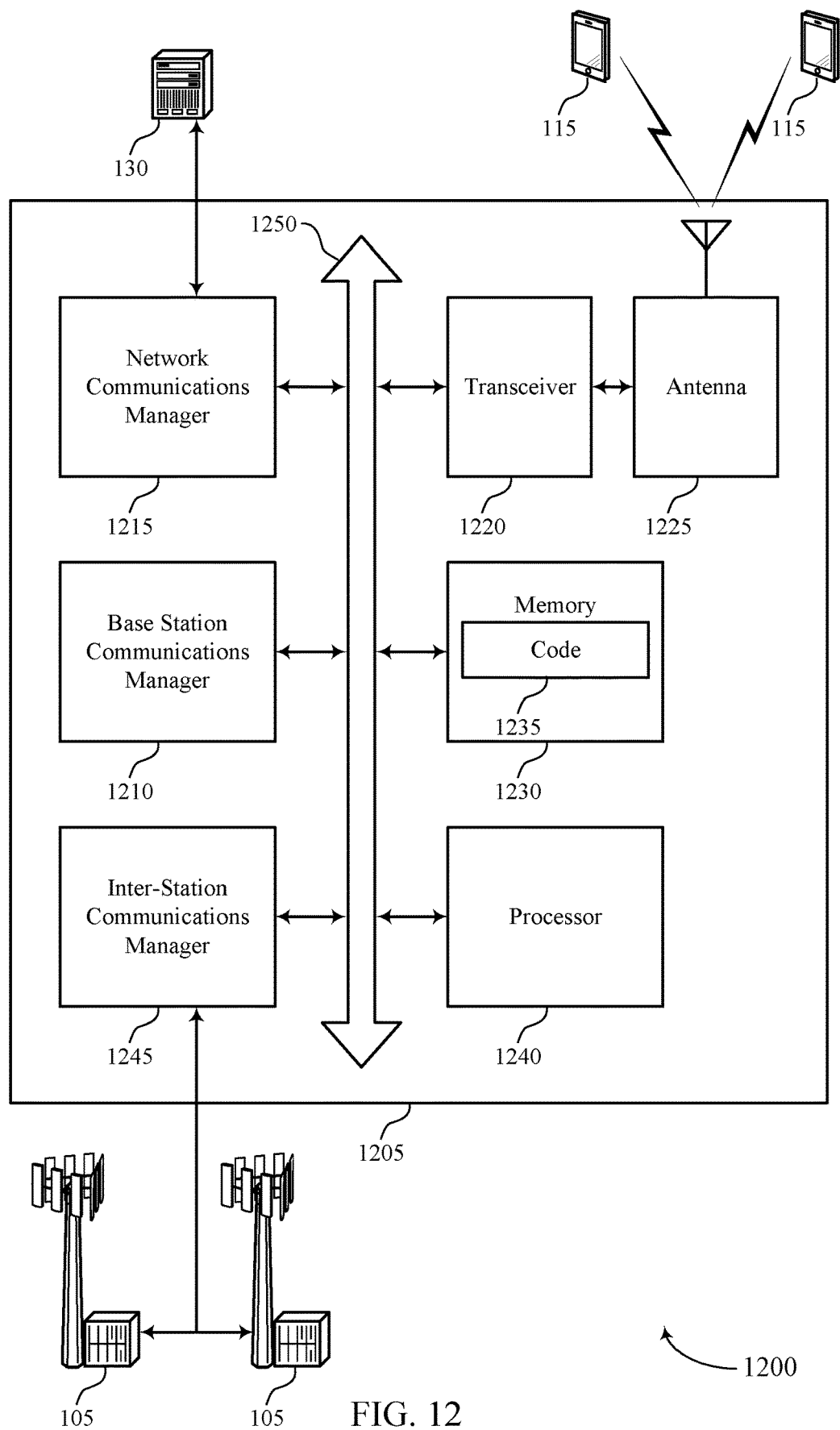
FIG. 12 shows a diagram of a system including a device that supports selective processing of multicast and broadcast retransmissions in accordance with aspects of the present disclosure.

FIG. 12 shows a diagram of a system 1200 including a device 1205 that supports selective processing of multicast and broadcast retransmissions in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a base station communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The base station communications manager 1210 may transmit, to a set of UEs, a multicast transmission. In some cases, the base station communications manager 1210 may determine to transmit a retransmission of the multicast transmission. Subsequently, the base station communications manager 1210 may transmit a message in a downlink control channel, the message indicating that a downlink shared channel transmission is the retransmission of the multicast transmission.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting selective processing of multicast and broadcast retransmissions).

The inter-station communications manager 1245 may manage communications with other base station 105 and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
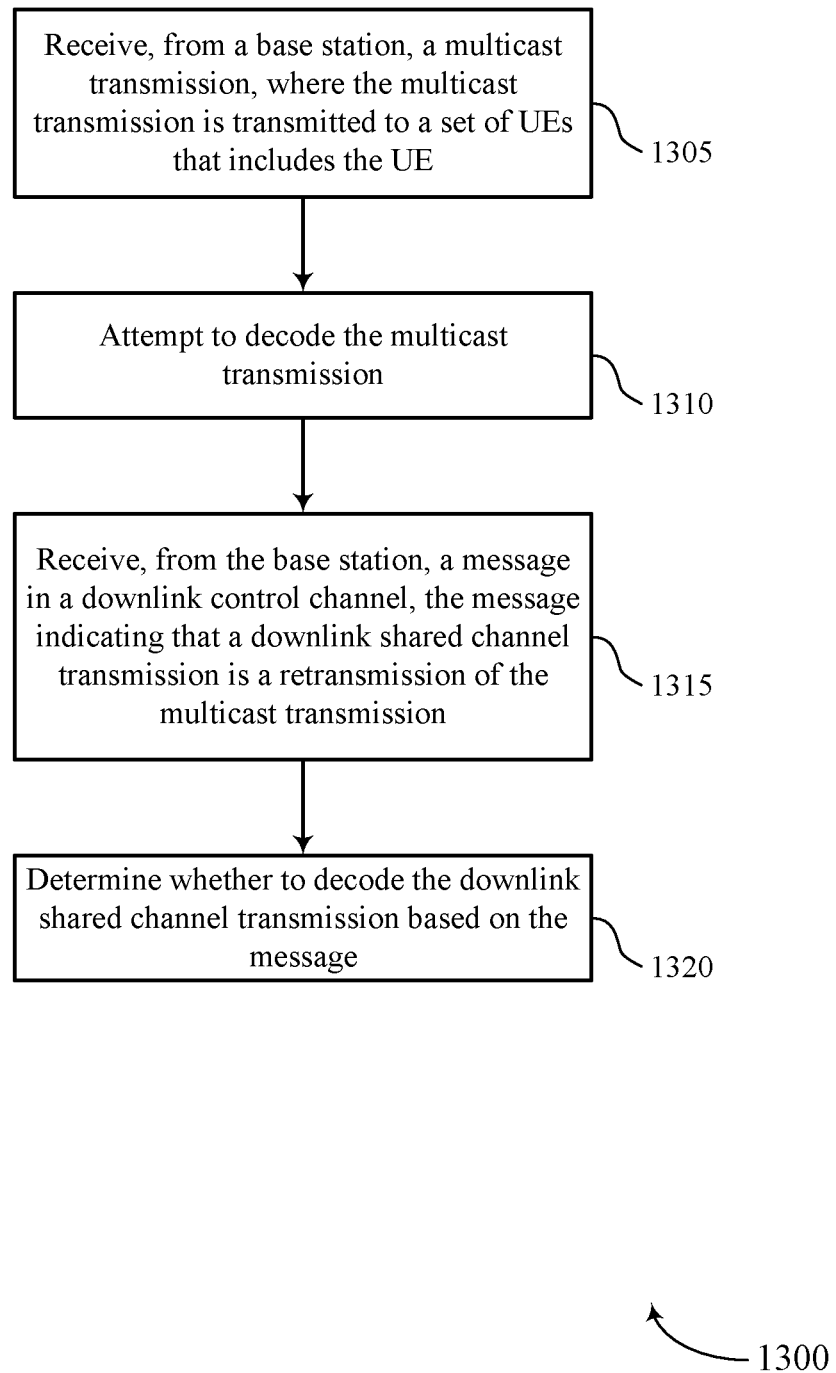
FIGS. 13 through 19 show flowcharts illustrating methods that support selective processing of multicast and broadcast retransmissions in accordance with aspects of the present disclosure.

FIG. 13 shows a flowchart illustrating a method 1300 that supports selective processing of multicast and broadcast retransmissions in accordance with aspects of the present disclosure. The operations of method 1300 may be implemented by a UE 115 or its components as described herein. For example, the operations of method 1300 may be performed by a UE communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive, from a base station, a multicast transmission, where the multicast transmission is transmitted to a set of UEs that includes the UE. The operations of 1305 may be performed according to the methods described herein. In some examples, aspects of the operations of 1305 may be performed by a multicast transmission receiver as described with reference to FIGS. 5 through 8.

At 1310, the UE may attempt to decode the multicast transmission. The operations of 1310 may be performed according to the methods described herein. In some examples, aspects of the operations of 1310 may be performed by a multicast transmission decoder as described with reference to FIGS. 5 through 8.

At 1315, the UE may receive, from the base station, a message in a downlink control channel, the message indicating that a downlink shared channel transmission is a retransmission of the multicast transmission. The operations of 1315 may be performed according to the methods described herein. In some examples, aspects of the operations of 1315 may be performed by a retransmission indication receiver as described with reference to FIGS. 5 through 8.

At 1320, the UE may determine whether to decode the downlink shared channel transmission based on the message. The operations of 1320 may be performed according to the methods described herein. In some examples, aspects of the operations of 1320 may be performed by a decoding determination component as described with reference to FIGS. 5 through 8.

Figure 14:
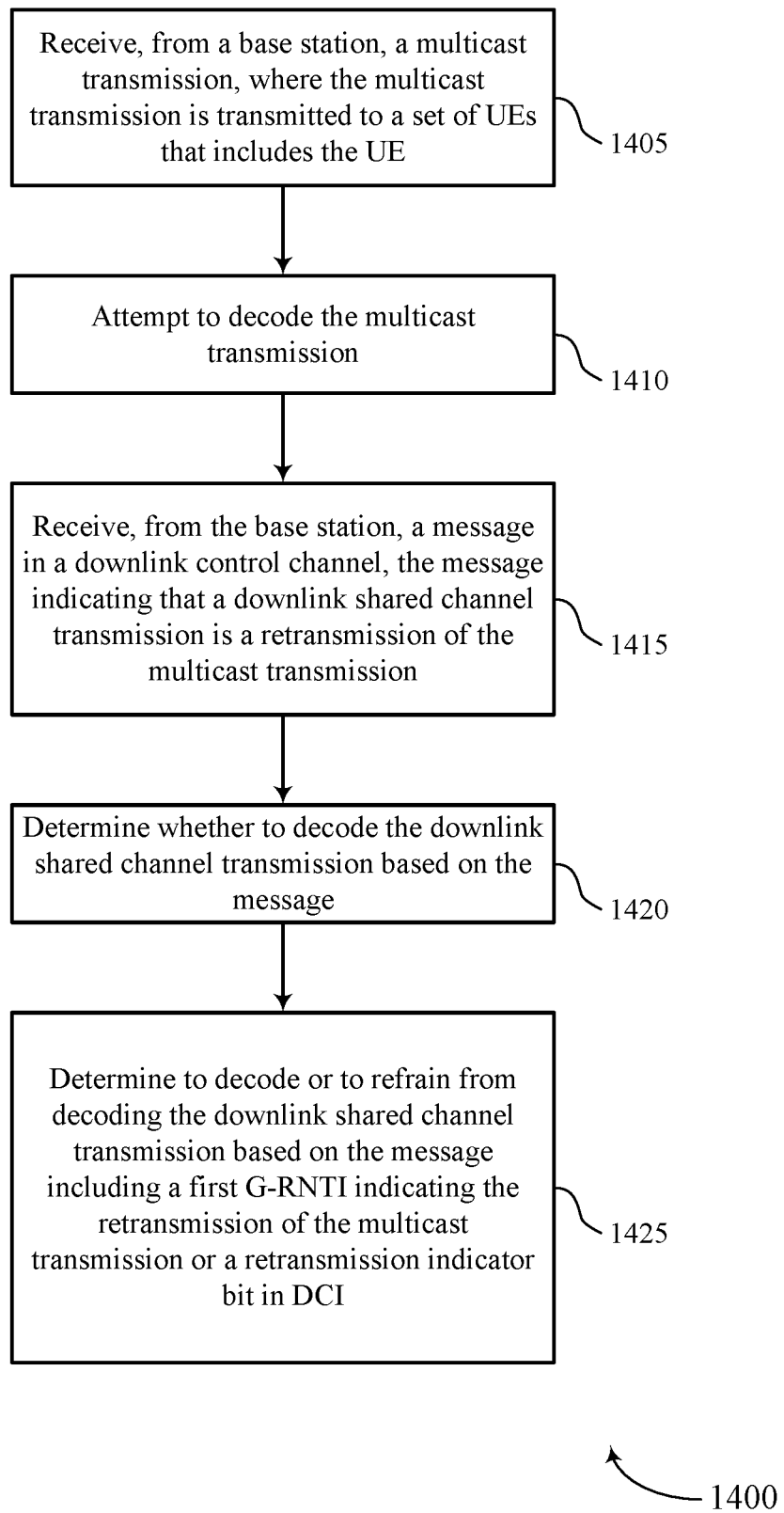

FIG. 14 shows a flowchart illustrating a method 1400 that supports selective processing of multicast and broadcast retransmissions in accordance with aspects of the present disclosure. The operations of method 1400 may be implemented by a UE 115 or its components as described herein. For example, the operations of method 1400 may be performed by a UE communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may receive, from a base station, a multicast transmission, where the multicast transmission is transmitted to a set of UEs that includes the UE. The operations of 1405 may be performed according to the methods described herein. In some examples, aspects of the operations of 1405 may be performed by a multicast transmission receiver as described with reference to FIGS. 5 through 8.

At 1410, the UE may attempt to decode the multicast transmission. The operations of 1410 may be performed according to the methods described herein. In some examples, aspects of the operations of 1410 may be performed by a multicast transmission decoder as described with reference to FIGS. 5 through 8.

At 1415, the UE may receive, from the base station, a message in a downlink control channel, the message indicating that a downlink shared channel transmission is a retransmission of the multicast transmission. The operations of 1415 may be performed according to the methods described herein. In some examples, aspects of the operations of 1415 may be performed by a retransmission indication receiver as described with reference to FIGS. 5 through 8.

At 1420, the UE may determine whether to decode the downlink shared channel transmission based on the message. The operations of 1420 may be performed according to the methods described herein. In some examples, aspects of the operations of 1420 may be performed by a decoding determination component as described with reference to FIGS. 5 through 8.

At 1425, the UE may determine to decode or to refrain from decoding the downlink shared channel transmission based on the message including a first G-RNTI indicating the retransmission of the multicast transmission or a retransmission indicator bit in DCI. The operations of 1425 may be performed according to the methods described herein. In some examples, aspects of the operations of 1425 may be performed by a decoding determination component as described with reference to FIGS. 5 through 8.

Figure 15:
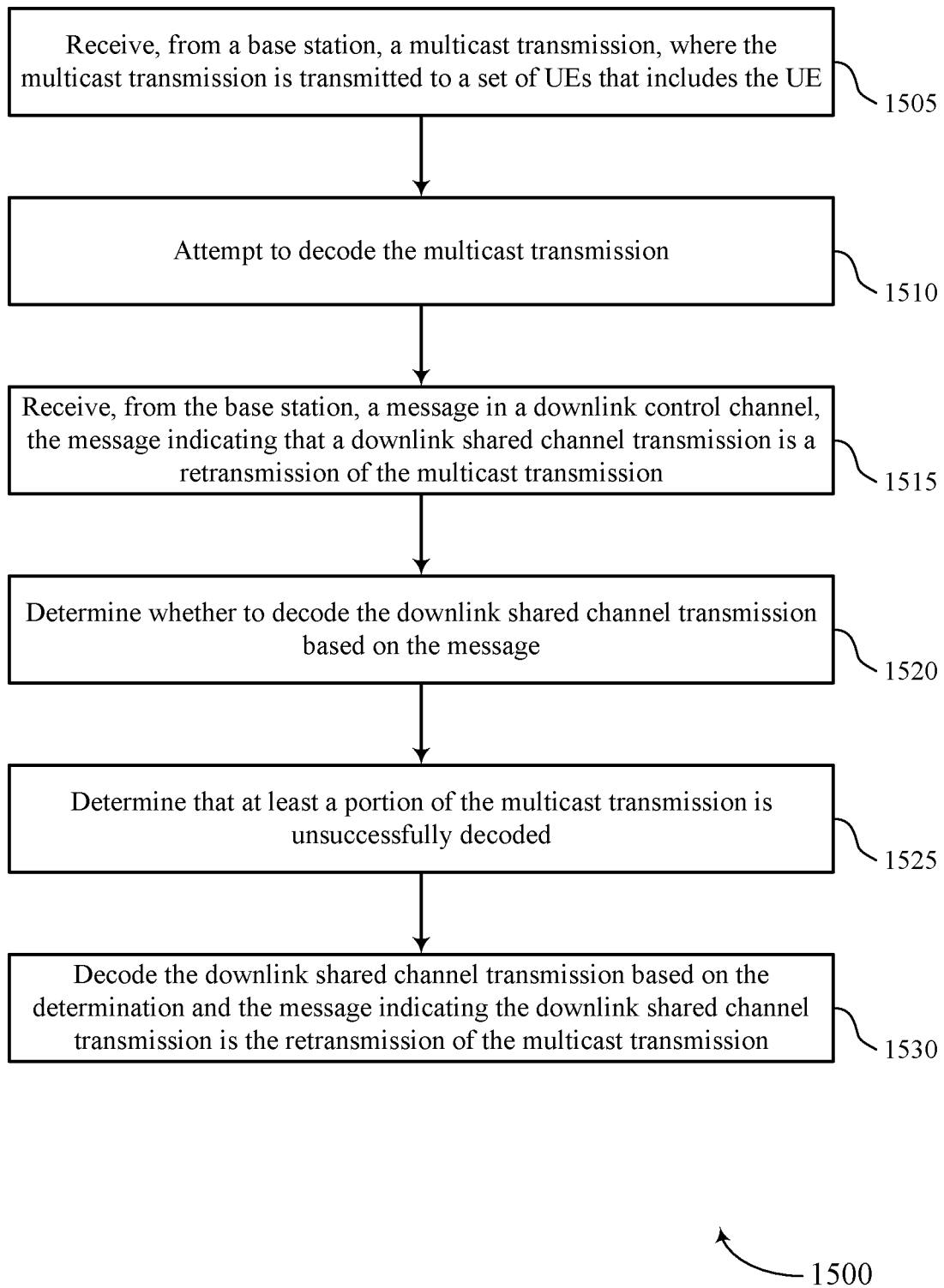

FIG. 15 shows a flowchart illustrating a method 1500 that supports selective processing of multicast and broadcast retransmissions in accordance with aspects of the present disclosure. The operations of method 1500 may be implemented by a UE 115 or its components as described herein. For example, the operations of method 1500 may be performed by a UE communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may receive, from a base station, a multicast transmission, where the multicast transmission is transmitted to a set of UEs that includes the UE. The operations of 1505 may be performed according to the methods described herein. In some examples, aspects of the operations of 1505 may be performed by a multicast transmission receiver as described with reference to FIGS. 5 through 8.

At 1510, the UE may attempt to decode the multicast transmission. The operations of 1510 may be performed according to the methods described herein. In some examples, aspects of the operations of 1510 may be performed by a multicast transmission decoder as described with reference to FIGS. 5 through 8.

At 1515, the UE may receive, from the base station, a message in a downlink control channel, the message indicating that a downlink shared channel transmission is a retransmission of the multicast transmission. The operations of 1515 may be performed according to the methods described herein. In some examples, aspects of the operations of 1515 may be performed by a retransmission indication receiver as described with reference to FIGS. 5 through 8.

At 1520, the UE may determine whether to decode the downlink shared channel transmission based on the message. The operations of 1520 may be performed according to the methods described herein. In some examples, aspects of the operations of 1520 may be performed by a decoding determination component as described with reference to FIGS. 5 through 8.

At 1525, the UE may determine that at least a portion of the multicast transmission is unsuccessfully decoded. The operations of 1525 may be performed according to the methods described herein. In some examples, aspects of the operations of 1525 may be performed by an idle state component as described with reference to FIGS. 5 through 8.

At 1530, the UE may decode the downlink shared channel transmission based on the determination and the message indicating the downlink shared channel transmission is the retransmission of the multicast transmission. The operations of 1530 may be performed according to the methods described herein. In some examples, aspects of the operations of 1530 may be performed by an idle state component as described with reference to FIGS. 5 through 8.

Figure 16:
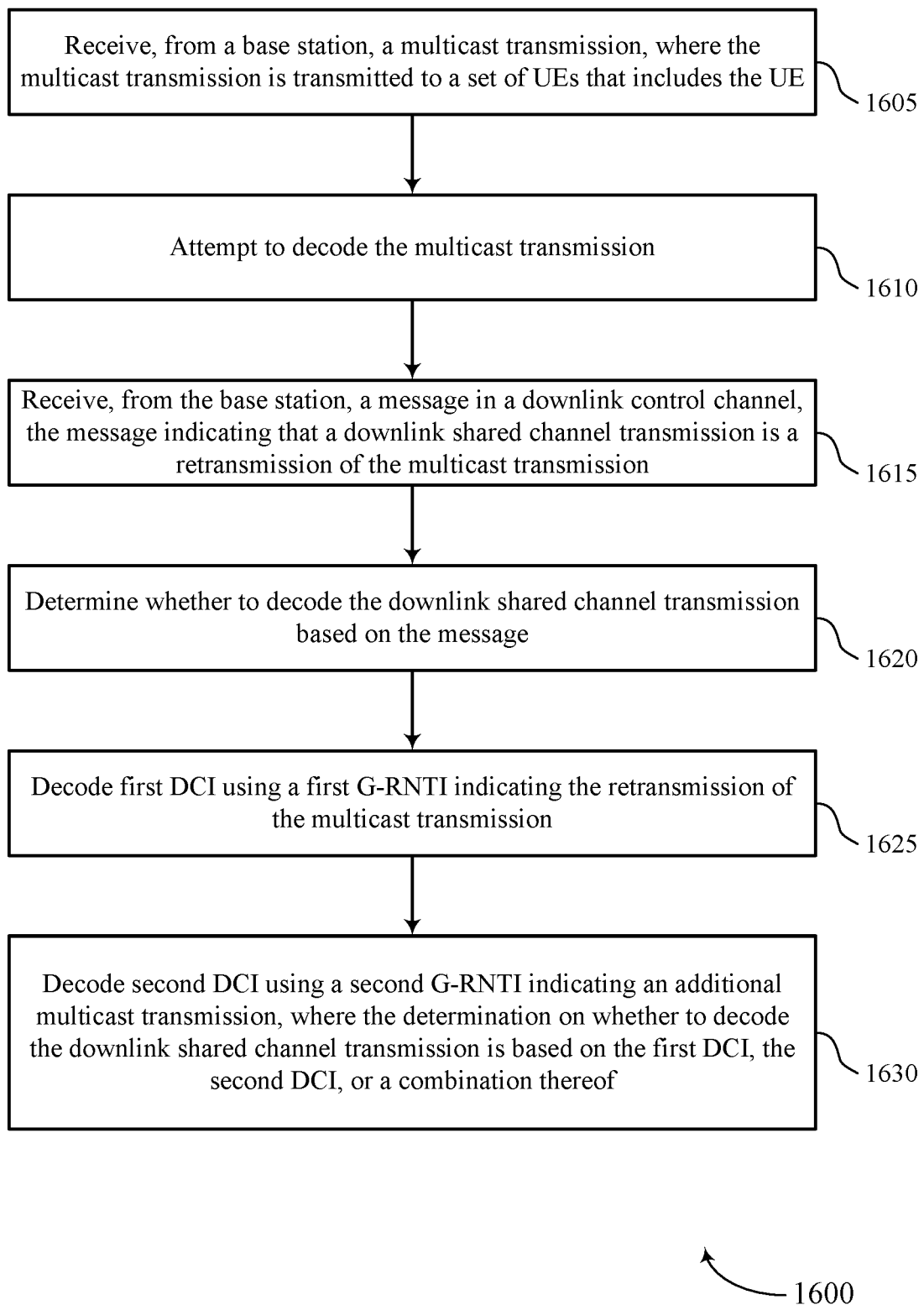

FIG. 16 shows a flowchart illustrating a method 1600 that supports selective processing of multicast and broadcast retransmissions in accordance with aspects of the present disclosure. The operations of method 1600 may be implemented by a UE 115 or its components as described herein. For example, the operations of method 1600 may be performed by a UE communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1605, the UE may receive, from a base station, a multicast transmission, where the multicast transmission is transmitted to a set of UEs that includes the UE. The operations of 1605 may be performed according to the methods described herein. In some examples, aspects of the operations of 1605 may be performed by a multicast transmission receiver as described with reference to FIGS. 5 through 8.

At 1610, the UE may attempt to decode the multicast transmission. The operations of 1610 may be performed according to the methods described herein. In some examples, aspects of the operations of 1610 may be performed by a multicast transmission decoder as described with reference to FIGS. 5 through 8.

At 1615, the UE may receive, from the base station, a message in a downlink control channel, the message indicating that a downlink shared channel transmission is a retransmission of the multicast transmission. The operations of 1615 may be performed according to the methods described herein. In some examples, aspects of the operations of 1615 may be performed by a retransmission indication receiver as described with reference to FIGS. 5 through 8.

At 1620, the UE may determine whether to decode the downlink shared channel transmission based on the message. The operations of 1620 may be performed according to the methods described herein. In some examples, aspects of the operations of 1620 may be performed by a decoding determination component as described with reference to FIGS. 5 through 8.

At 1625, the UE may decode first DCI using a first G-RNTI indicating the retransmission of the multicast transmission. The operations of 1625 may be performed according to the methods described herein. In some examples, aspects of the operations of 1625 may be performed by a DCI decoder as described with reference to FIGS. 5 through 8.

At 1630, the UE may decode second DCI using a second G-RNTI indicating an additional multicast transmission, where the determination on whether to decode the downlink shared channel transmission is based on the first DCI, the second DCI, or a combination thereof. The operations of 1630 may be performed according to the methods described herein. In some examples, aspects of the operations of 1630 may be performed by a DCI decoder as described with reference to FIGS. 5 through 8.

Figure 17:
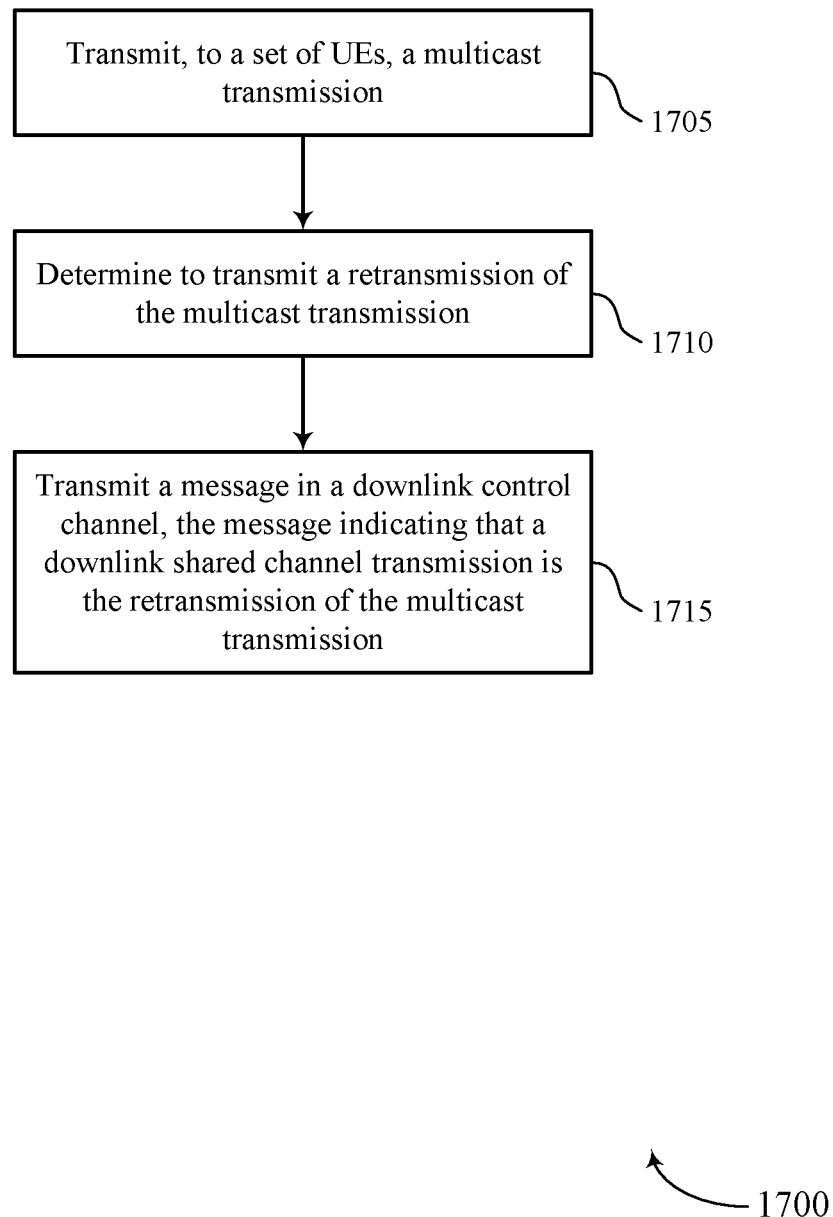

FIG. 17 shows a flowchart illustrating a method 1700 that supports selective processing of multicast and broadcast retransmissions in accordance with aspects of the present disclosure. The operations of method 1700 may be implemented by a base station 105 or its components as described herein. For example, the operations of method 1700 may be performed by a base station communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1705, the base station may transmit, to a set of UEs, a multicast transmission. The operations of 1705 may be performed according to the methods described herein. In some examples, aspects of the operations of 1705 may be performed by a multicast transmission transmitter as described with reference to FIGS. 9 through 12.

At 1710, the base station may determine to transmit a retransmission of the multicast transmission. The operations of 1710 may be performed according to the methods described herein. In some examples, aspects of the operations of 1710 may be performed by a retransmission determination component as described with reference to FIGS. 9 through 12.

At 1715, the base station may transmit a message in a downlink control channel, the message indicating that a downlink shared channel transmission is the retransmission of the multicast transmission. The operations of 1715 may be performed according to the methods described herein. In some examples, aspects of the operations of 1715 may be performed by a retransmission indicator as described with reference to FIGS. 9 through 12.

Figure 18:
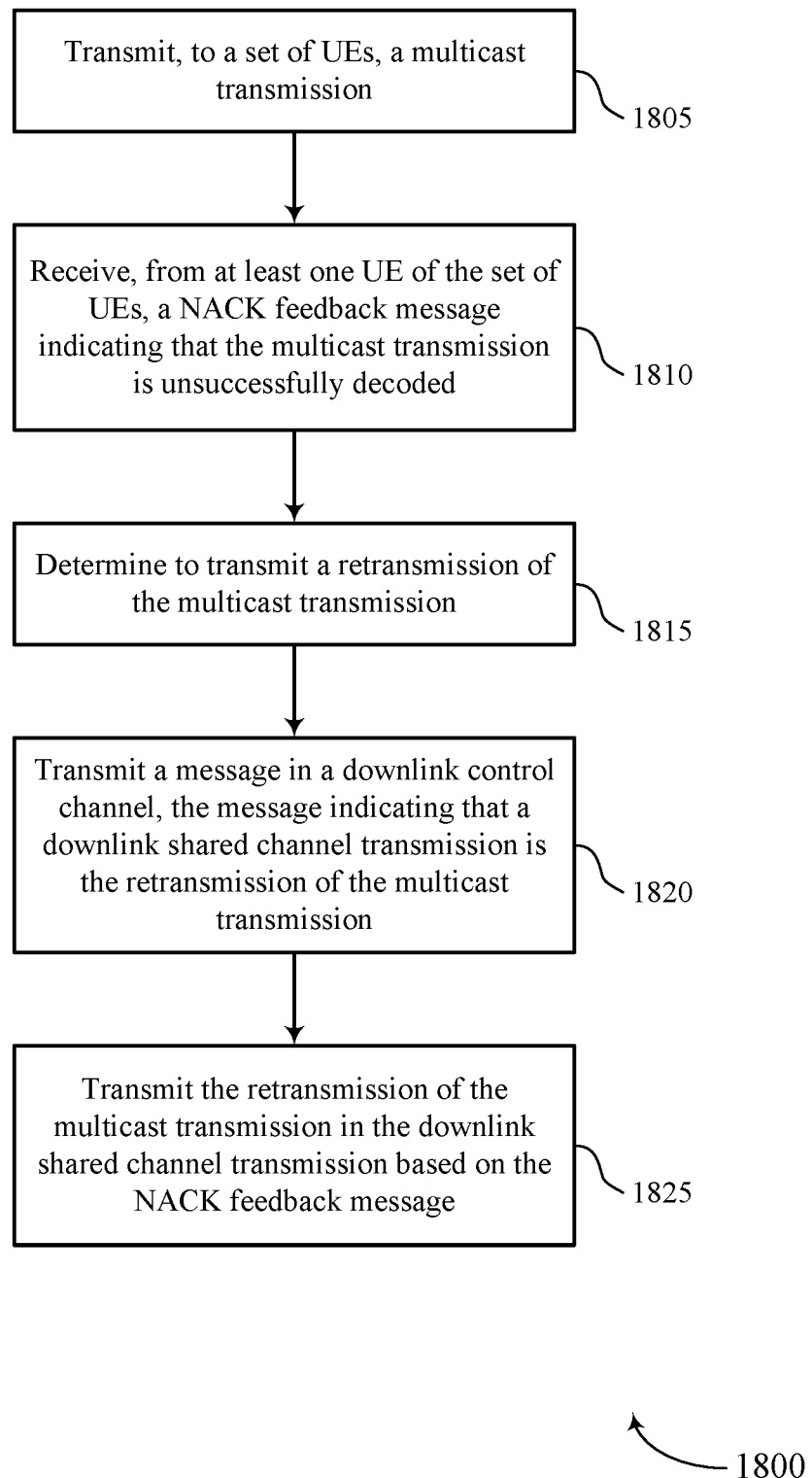

FIG. 18 shows a flowchart illustrating a method 1800 that supports selective processing of multicast and broadcast retransmissions in accordance with aspects of the present disclosure. The operations of method 1800 may be implemented by a base station 105 or its components as described herein. For example, the operations of method 1800 may be performed by a base station communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1805, the base station may transmit, to a set of UEs, a multicast transmission. The operations of 1805 may be performed according to the methods described herein. In some examples, aspects of the operations of 1805 may be performed by a multicast transmission transmitter as described with reference to FIGS. 9 through 12.

At 1810, the base station may receive, from at least one UE of the set of UEs, a NACK feedback message indicating that the multicast transmission is unsuccessfully decoded. The operations of 1810 may be performed according to the methods described herein. In some examples, aspects of the operations of 1810 may be performed by a NACK receiver as described with reference to FIGS. 9 through 12.

At 1815, the base station may determine to transmit a retransmission of the multicast transmission. The operations of 1815 may be performed according to the methods described herein. In some examples, aspects of the operations of 1815 may be performed by a retransmission determination component as described with reference to FIGS. 9 through 12.

At 1820, the base station may transmit a message in a downlink control channel, the message indicating that a downlink shared channel transmission is the retransmission of the multicast transmission. The operations of 1820 may be performed according to the methods described herein. In some examples, aspects of the operations of 1820 may be performed by a retransmission indicator as described with reference to FIGS. 9 through 12.

At 1825, the base station may transmit the retransmission of the multicast transmission in the downlink shared channel transmission based on the NACK feedback message. The operations of 1825 may be performed according to the methods described herein. In some examples, aspects of the operations of 1825 may be performed by a NACK receiver as described with reference to FIGS. 9 through 12.

Figure 19:
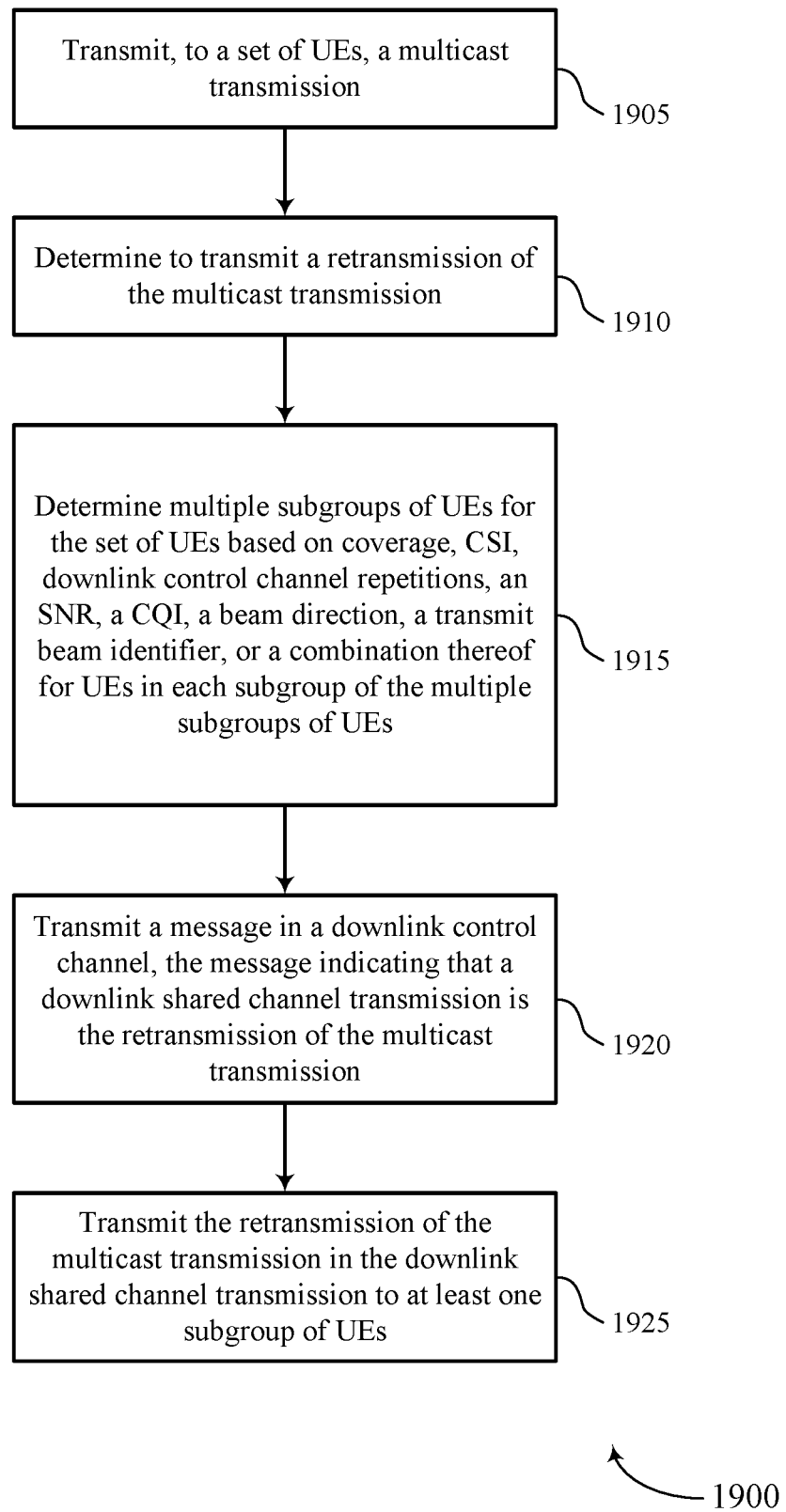

FIG. 19 shows a flowchart illustrating a method 1900 that supports selective processing of multicast and broadcast retransmissions in accordance with aspects of the present disclosure. The operations of method 1900 may be implemented by a base station 105 or its components as described herein. For example, the operations of method 1900 may be performed by a base station communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1905, the base station may transmit, to a set of UEs, a multicast transmission. The operations of 1905 may be performed according to the methods described herein. In some examples, aspects of the operations of 1905 may be performed by a multicast transmission transmitter as described with reference to FIGS. 9 through 12.

At 1910, the base station may determine to transmit a retransmission of the multicast transmission. The operations of 1910 may be performed according to the methods described herein. In some examples, aspects of the operations of 1910 may be performed by a retransmission determination component as described with reference to FIGS. 9 through 12.

At 1915, the base station may determine multiple subgroups of UEs for the set of UEs based on coverage, CSI, downlink control channel repetitions, an SNR, a CQI, a beam direction, a transmit beam identifier, or a combination thereof for UEs in each subgroup of the multiple subgroups of UEs. The operations of 1915 may be performed according to the methods described herein. In some examples, aspects of the operations of 1915 may be performed by a subgroup determination component as described with reference to FIGS. 9 through 12.

At 1920, the base station may transmit a message in a downlink control channel, the message indicating that a downlink shared channel transmission is the retransmission of the multicast transmission. The operations of 1920 may be performed according to the methods described herein. In some examples, aspects of the operations of 1920 may be performed by a retransmission indicator as described with reference to FIGS. 9 through 12.

At 1925, the base station may transmit the retransmission of the multicast transmission in the downlink shared channel transmission to at least one subgroup of UEs. The operations of 1925 may be performed according to the methods described herein. In some examples, aspects of the operations of 1925 may be performed by a subgroup determination component as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a UE, comprising: receiving, from a base station, a multicast transmission, wherein the multicast transmission is transmitted to a plurality of UEs that includes the UE; attempting to decode the multicast transmission; receiving, from the base station, a message in a downlink control channel, the message indicating that a downlink shared channel transmission is a retransmission of the multicast transmission; and determining whether to decode the downlink shared channel transmission based at least in part on the message.

Aspect 2: The method of aspect 1, wherein determining whether to decode the downlink shared channel transmission further comprises: determining to decode or to refrain from decoding the downlink shared channel transmission based at least in part on the message comprising a first group radio network temporary identifier indicating the retransmission of the multicast transmission or a retransmission indicator bit in downlink control information.

Aspect 3: The method of any of aspects 1 through 2, further comprising: refraining from decoding the downlink shared channel transmission based at least in part on the message indicating the downlink shared channel transmission is the retransmission of the multicast transmission, wherein the multicast transmission is successfully decoded.

Aspect 4: The method of any of aspects 1 through 2, further comprising: decoding the downlink shared channel transmission based at least in part on the message indicating the downlink shared channel transmission is the retransmission of the multicast transmission, wherein the multicast transmission is unsuccessfully decoded.

Aspect 5: The method of any of aspects 1 through 4, further comprising: transmitting, to the base station, an acknowledgment feedback message based at least in part on decoding the multicast transmission.

Aspect 6: The method of aspect 5, further comprising: refraining from decoding the downlink shared channel transmission based at least in part on the acknowledgment feedback message indicating the multicast transmission is successfully decoded by the UE and the message indicating the downlink shared channel transmission is the retransmission of the multicast transmission.

Aspect 7: The method of aspect 5, further comprising: decoding the downlink shared channel transmission based at least in part on the acknowledgment feedback message indicating the multicast transmission is unsuccessfully decoded by the UE and the message indicating the downlink shared channel transmission is the retransmission of the multicast transmission.

Aspect 8: The method of any of aspects 5 through 7, wherein the acknowledgment feedback message is transmitted based at least in part on being in a connected state.

Aspect 9: The method of any of aspects 1 through 8, further comprising: determining that at least a portion of the multicast transmission is unsuccessfully decoded; and decoding the downlink shared channel transmission based at least in part on the determination and the message indicating the downlink shared channel transmission is the retransmission of the multicast transmission.

Aspect 10: The method of aspect 9, wherein the determination that at least the portion of the multicast transmission is unsuccessfully decoded is made at a radio link control layer of the UE and is based at least in part on being in an idle or inactive state.

Aspect 11: The method of any of aspects 1 through 10, further comprising: decoding first downlink control information using a first group radio network temporary identifier indicating the retransmission of the multicast transmission; and decoding second downlink control information using a second group radio network temporary identifier indicating an additional multicast transmission, wherein the determination on whether to decode the downlink shared channel transmission is based at least in part on the first downlink control information, the second downlink control information, or a combination thereof.

Aspect 12: The method of aspect 11, wherein the first downlink control information and the second downlink control information are decoded based at least in part on a processing parameter of the UE.

Aspect 13: The method of any of aspects 1 through 12, further comprising: transmitting, to the base station, a negative acknowledgment feedback message based at least in part on unsuccessfully decoding the multicast transmission; and decoding first downlink control information using a first group radio network temporary identifier indicating the retransmission of the multicast transmission based at least in part on transmitting the negative acknowledgment feedback message.

Aspect 14: The method of aspect 13, wherein the first downlink control information and the first group radio network temporary identifier are associated with a second downlink control information and a cell radio network temporary identifier, and the first downlink control information is monitored using the first group radio network temporary identifier based at least in part on monitoring the second downlink control information using the cell radio network temporary identifier.

Aspect 15: The method of any of aspects 1 through 14, further comprising: determining the message is allocated for a subgroup of UEs for the plurality of UEs, wherein the subgroup of UEs comprises the UE; and decoding the downlink shared channel transmission based at least in part on the message being allocated to the subgroup of UEs and the message indicating the downlink shared channel transmission is the retransmission of the multicast transmission.

Aspect 16: The method of aspect 15, wherein the subgroup of UEs is determined based at least in part on channel state information reports from the plurality of UEs.

Aspect 17: The method of any of aspects 15 through 16, wherein the subgroup of UEs is one subgroup of a plurality of subgroups of UEs, each subgroup of the plurality of subgroups of UEs being based at least in part on coverage, channel state information, downlink control channel repetitions, a signal-to-noise ratio, a channel quality indicator, a beam direction, a transmit beam identifier, or a combination thereof for UEs in each subgroup.

Aspect 18: The method of any of aspects 1 through 17, wherein the message in the downlink control channel is received at a layer one of the UE, and the downlink shared channel transmission is decoded at the layer one of the UE and sent to a layer two of the UE for processing.

Aspect 19: A method for wireless communications at a base station, comprising: transmitting, to a plurality of user equipment (UEs), a multicast transmission; determining to transmit a retransmission of the multicast transmission; and transmitting a message in a downlink control channel, the message indicating that a downlink shared channel transmission is the retransmission of the multicast transmission.

Aspect 20: The method of aspect 19, wherein determining to transmit the retransmission of the multicast transmission further comprises: receiving, from at least one UE of the plurality of UEs, a negative acknowledgment feedback message indicating that the multicast transmission is unsuccessfully decoded; and transmitting the retransmission of the multicast transmission in the downlink shared channel transmission based at least in part on the negative acknowledgment feedback message.

Aspect 21: The method of any of aspects 19 through 20, wherein the message comprises a first group radio network temporary identifier indicating the retransmission of the multicast transmission or a retransmission indicator bit in downlink control information.

Aspect 22: The method of any of aspects 19 through 21, further comprising: determining multiple subgroups of UEs for the plurality of UEs based at least in part on coverage, channel state information, downlink control channel repetitions, a signal-to-noise ratio, a channel quality indicator, a beam direction, a transmit beam identifier, or a combination thereof for UEs in each subgroup of the multiple subgroups of UEs; and transmitting the retransmission of the multicast transmission in the downlink shared channel transmission to at least one subgroup of UEs.

Aspect 23: The method of aspect 22, further comprising: receiving, from at least one UE in one subgroup of the multiple subgroups of UEs, a negative acknowledgment feedback message indicating that the multicast transmission is unsuccessfully decoded; and transmitting, to the one subgroup, the retransmission of the multicast transmission in the downlink shared channel transmission based at least in part on the negative acknowledgment feedback message.

Aspect 24: The method of any of aspects 19 through 23, wherein the message in the downlink control channel is transmitted to a layer one of the plurality of UEs, and the downlink shared channel transmission is transmitted over the layer one to the plurality of UEs containing layer two data packets.

Aspect 25: An apparatus for wireless communications at a UE, comprising a processor; memory coupled with the processor; and instructions stored in the memory and executable by the processor to cause the apparatus to perform a method of any of aspects 1 through 18.

Aspect 26: An apparatus for wireless communications at a UE, comprising at least one means for performing a method of any of aspects 1 through 18.

Aspect 27: A non-transitory computer-readable medium storing code for wireless communications at a UE, the code comprising instructions executable by a processor to perform a method of any of aspects 1 through 18.

Aspect 28: An apparatus for wireless communications at a base station, comprising a processor; memory coupled with the processor; and instructions stored in the memory and executable by the processor to cause the apparatus to perform a method of any of aspects 19 through 24.

Aspect 29: An apparatus for wireless communications at a base station, comprising at least one means for performing a method of any of aspects 19 through 24.

Aspect 30: A non-transitory computer-readable medium storing code for wireless communications at a base station, the code comprising instructions executable by a processor to perform a method of any of aspects 19 through 24.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:
1. A method for wireless communications at a user equipment (UE), comprising:
receiving, from an access network entity, a new transmission of multicast data, wherein the multicast data is transmitted to a plurality of UEs that includes the UE;
attempting to decode the multicast data from the new transmission;
receiving, from the access network entity, a message in downlink control information via a downlink control channel, the message comprising an identifier that is a first group radio network temporary identifier or a retransmission indicator bit indicating that a downlink shared channel comprises a retransmission of the multicast data, wherein the retransmission includes same multicast data as the new transmission, and the message comprises an identifier indicating the retransmission of the multicast data and differentiating the retransmission of the multicast data from the new transmission of the multicast data; and
determining whether to decode the downlink shared channel based at least in part on the message comprising the identifier.
2. The method of claim 1, further comprising:
refraining from decoding the downlink shared channel based at least in part on the message indicating that the downlink shared channel comprises the retransmission of the multicast data, wherein the multicast data from the new transmission is successfully decoded.
3. The method of claim 1, further comprising:
decoding the downlink shared channel based at least in part on the message indicating that the downlink shared channel comprises the retransmission of the multicast data, wherein the multicast data from the new transmission is unsuccessfully decoded.
4. The method of claim 1, further comprising:
transmitting, to the access network entity, an acknowledgment feedback message based at least in part on decoding the multicast data from the new transmission.
5. The method of claim 4, further comprising:
refraining from decoding the downlink shared channel based at least in part on the acknowledgment feedback message indicating that the multicast data from the new transmission is successfully decoded by the UE and the message indicating that the downlink shared channel comprises the retransmission of the multicast data.
6. The method of claim 4, further comprising:
decoding the downlink shared channel based at least in part on the acknowledgment feedback message indicating that the multicast data from the new transmission is unsuccessfully decoded by the UE and the message indicating that the downlink shared channel comprises the retransmission of the multicast data.
7. The method of claim 4, wherein the acknowledgment feedback message is transmitted based at least in part on being in a connected state.
8. The method of claim 1, further comprising:
determining that at least a portion of the multicast data from the new transmission is unsuccessfully decoded; and
decoding the downlink shared channel based at least in part on the determination and the message indicating that the downlink shared channel comprises the retransmission of the multicast data.
9. The method of claim 8, wherein the determination that at least the portion of the multicast data from the new transmission is unsuccessfully decoded is made at a radio link control layer of the UE and is based at least in part on being in an idle or inactive state.

10. The method of claim 1, further comprising:
decoding first downlink control information using a first group radio network temporary identifier indicating that the downlink shared channel comprises the retransmission of the multicast data; and
decoding second downlink control information using a second group radio network temporary identifier indicating additional multicast data, wherein the determination on whether to decode the downlink shared channel is based at least in part on the first downlink control information, the second downlink control information, or a combination thereof.

11. The method of claim 10, wherein the first downlink control information and the second downlink control information are decoded based at least in part on a processing parameter of the UE.

12. The method of claim 1, further comprising:
transmitting, to the access network entity, a negative acknowledgment feedback message based at least in part on unsuccessfully decoding the multicast data from the new transmission; and
decoding first downlink control information using a first group radio network temporary identifier indicating that the downlink shared channel comprises the retransmission of the multicast data based at least in part on transmitting the negative acknowledgment feedback message.

13. The method of claim 12, wherein the first downlink control information and the first group radio network temporary identifier are associated with a second downlink control information and a cell radio network temporary identifier, and the first downlink control information is monitored using the first group radio network temporary identifier based at least in part on monitoring the second downlink control information using the cell radio network temporary identifier.

14. The method of claim 1, further comprising:
determining that the message is allocated for a subgroup of UEs of the plurality of UEs, wherein the subgroup of UEs comprises the UE; and
decoding the downlink shared channel based at least in part on the message being allocated to the subgroup of UEs and the message indicating that the downlink shared channel comprises the retransmission of the multicast data.

15. The method of claim 14, wherein the subgroup of UEs is determined based at least in part on channel state information reports from the plurality of UEs.

16. The method of claim 14, wherein the subgroup of UEs is one subgroup of a plurality of subgroups of UEs, each subgroup of the plurality of subgroups of UEs being based at least in part on coverage, channel state information, downlink control channel repetitions, a signal-to-noise ratio, a channel quality indicator, a beam direction, a transmit beam identifier, or a combination thereof for UEs in each subgroup.

17. The method of claim 1, wherein the message in the downlink control channel is received at a layer one of the UE, and the downlink shared channel is decoded at the layer one of the UE and sent to a layer two of the UE for processing.

18. A method for wireless communications at an access network entity, comprising:
transmitting, to a plurality of user equipment (UEs), a new transmission of multicast data;
determining to transmit a retransmission of the multicast data; and
transmitting a message in a downlink control channel, the message comprising an identifier that is a first group radio network temporary identifier or a retransmission indicator bit indicating that a downlink shared channel comprises the retransmission of the multicast data, wherein the retransmission includes same multicast data as the new transmission, and the message comprises an identifier indicating the retransmission of the multicast data and differentiating the retransmission of the multicast data from the new transmission of the multicast data.

19. The method of claim 18, wherein determining to transmit the retransmission of the multicast data further comprises:
receiving, from at least one UE of the plurality of UEs, a negative acknowledgment feedback message indicating that the multicast data from the new transmission is unsuccessfully decoded; and
transmitting the retransmission of the multicast data in the downlink shared channel based at least in part on the negative acknowledgment feedback message.

20. The method of claim 18, further comprising:
determining multiple subgroups of UEs of the plurality of UEs based at least in part on coverage, channel state information, downlink control channel repetitions, a signal-to-noise ratio, a channel quality indicator, a beam direction, a transmit beam identifier, or a combination thereof for UEs in each subgroup of the multiple subgroups of UEs; and
transmitting the retransmission of the multicast data in the downlink shared channel to at least one subgroup of UEs.

21. The method of claim 20, further comprising:
receiving, from at least one UE in one subgroup of the multiple subgroups of UEs, a negative acknowledgment feedback message indicating that the multicast data from the new transmission is unsuccessfully decoded; and
transmitting, to the one subgroup, the retransmission of the multicast data in the downlink shared channel based at least in part on the negative acknowledgment feedback message.

22. The method of claim 18, wherein the message in the downlink control channel is transmitted to a layer one of the plurality of UEs, and the retransmission of the multicast data is transmitted over the layer one to the plurality of UEs containing layer two data packets.

23. An apparatus for wireless communications at a user equipment (UE), comprising:
a processor,
memory coupled with the processor; and
instructions stored in the memory and executable by the processor to cause the apparatus to:
receive, from an access network entity, a new transmission of multicast data, wherein the multicast data is transmitted to a plurality of UEs that includes the UE;
attempt to decode the multicast data from the new transmission;
receive, from the access network entity, a message in downlink control information via a downlink control channel, the message comprising an identifier that is a first group radio network temporary identifier or a retransmission indicator bit indicating that a downlink shared channel comprises a retransmission of the multicast data, wherein the retransmission includes same multicast data as the new transmission, and the message comprises an identifier indicating the retransmission of the multicast data and differentiating the retransmission of the multicast data from the new transmission of the multicast data; and determine whether to decode the downlink shared channel based at least in part on the message comprising the identifier.

24. The apparatus of claim 23, wherein the instructions are further executable by the processor to cause the apparatus to:

refrain from decoding the downlink shared channel based at least in part on the message indicating that the downlink shared channel comprises the retransmission of the multicast data, wherein the multicast data from the new transmission is successfully decoded.

25. The apparatus of claim 23, wherein the instructions are further executable by the processor to cause the apparatus to:

decode the downlink shared channel based at least in part on the message indicating that the downlink shared channel comprises the retransmission of the multicast data, wherein the multicast data from the new transmission is unsuccessfully decoded.

26. An apparatus for wireless communications at an access network entity, comprising:

a processor, memory coupled with the processor; and instructions stored in the memory and executable by the processor to cause the apparatus to:

transmit, to a plurality of user equipment (UEs), a new transmission of multicast data;

determine to transmit a retransmission of the multicast data; and transmit a message in a downlink control channel, the message comprising an identifier that is a first group radio network temporary identifier or a retransmission indicator bit indicating that a downlink shared channel comprises the retransmission of the multicast data, wherein the retransmission includes same multicast data as the new transmission, and the message comprises an identifier indicating the retransmission of the multicast data and differentiating the retransmission of the multicast data from the new transmission of the multicast data.

27. The apparatus of claim 26, wherein the instructions to determine to transmit the retransmission of the multicast data are further executable by the processor to cause the apparatus to:

receive, from at least one UE of the plurality of UEs, a negative acknowledgment feedback message indicating that the multicast data from the new transmission is unsuccessfully decoded; and transmit the retransmission of the multicast data in the downlink shared channel based at least in part on the negative acknowledgment feedback message.

\* \* \* \* \*